US011817721B2

(12) United States Patent
Johnston et al.

(10) Patent No.: US 11,817,721 B2
(45) Date of Patent: Nov. 14, 2023

(54) SYSTEMS AND METHODS FOR MANAGING COEXISTENCE OF WIRELESS-POWER SIGNALS AND DATA SIGNALS OPERATING IN A SAME FREQUENCY BAND

(71) Applicant: Energous Corporation, San Jose, CA (US)

(72) Inventors: Cesar Johnston, Sunnyvale, CA (US); Deepak Jain, San Ramon, CA (US); Howard Chan, San Jose, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 17/728,634

(22) Filed: Apr. 25, 2022

(65) Prior Publication Data

US 2023/0010476 A1  Jan. 12, 2023

Related U.S. Application Data

(63) Continuation of application No. 16/174,172, filed on Oct. 29, 2018, now Pat. No. 11,342,798.

(Continued)

(51) Int. Cl.
*H02J 50/80* (2016.01)
*H02J 50/20* (2016.01)
(Continued)

(52) U.S. Cl.
CPC .......... *H02J 50/80* (2016.02); *H02J 7/00034* (2020.01); *H02J 7/0071* (2020.01); *H02J 50/20* (2016.02);
(Continued)

(58) Field of Classification Search
CPC ...... H02J 50/80; H02J 7/00034; H02J 7/0071; H02J 50/20; H02J 50/10; H02J 50/12;
(Continued)

(56) References Cited

U.S. PATENT DOCUMENTS

| 787,412 A | 4/1905 | Tesla |
| 2,863,148 A | 12/1958 | Gammon et al. |

(Continued)

FOREIGN PATENT DOCUMENTS

| CN | 1829999 A | 9/2006 |
| CN | 101465471 A | 6/2009 |

(Continued)

OTHER PUBLICATIONS

Energous Corp., IPRP, PCT/US2014/037072, Nov. 10, 2015, 6 pgs.
(Continued)

*Primary Examiner* — Rexford N Barnie
*Assistant Examiner* — Rasem Mourad
(74) *Attorney, Agent, or Firm* — Morgan, Lewis & Bockius LLP

(57) ABSTRACT

A method of wireless power transmission is performed at a wireless-power-transmitting device having one or more antennas configured to transmit wireless-power signals, one or more processors, and a wireless data transceiver. The method comprises detecting that a wireless-power-receiving device is located in proximity to the wireless-power-transmitting device; establishing a data-traffic profile associated with the wireless-power-receiving device, the data-traffic profile including identifications of data signals to be exchanged over a predetermined frequency band between the wireless-power-receiving device and the wireless-power-transmitting device using the wireless data transceiver, determining windows of time during which to transmit wireless-power signals over the predetermined frequency band to the wireless-power-receiving device based on the data-traffic profile; and at the determined windows of time, transmitting, by the one or more antennas, wireless-power signals over the predetermined frequency band to the wireless-power-receiving device.

20 Claims, 20 Drawing Sheets

Related U.S. Application Data

(60) Provisional application No. 62/579,049, filed on Oct. 30, 2017.

(51) Int. Cl.
| | |
|---|---|
| *H04B 5/00* | (2006.01) |
| *H02J 7/00* | (2006.01) |
| H02J 50/40 | (2016.01) |
| H02J 50/90 | (2016.01) |
| H02J 50/30 | (2016.01) |
| H02J 50/12 | (2016.01) |
| H02J 50/15 | (2016.01) |
| H02J 50/10 | (2016.01) |

(52) U.S. Cl.
CPC ............ *H04B 5/0037* (2013.01); *H02J 50/10* (2016.02); *H02J 50/12* (2016.02); *H02J 50/15* (2016.02); *H02J 50/30* (2016.02); *H02J 50/40* (2016.02); *H02J 50/90* (2016.02); *H04B 5/0056* (2013.01)

(58) Field of Classification Search
CPC . H02J 50/15; H02J 50/40; H02J 50/90; H04B 5/0037; H04W 52/281
See application file for complete search history.

(56) References Cited

U.S. PATENT DOCUMENTS

| | | |
|---|---|---|
| 3,167,775 A | 1/1965 | Guertler |
| 3,434,678 A | 3/1969 | Brown et al. |
| 3,696,384 A | 10/1972 | Lester |
| 3,754,269 A | 8/1973 | Gavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |

(56) References Cited

U.S. PATENT DOCUMENTS

| | | |
|---|---|---|
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 450,449 A1 | 9/2016 | Leabman et al. |
| 9,438,045 B1 | 9/2016 | Leabman |
| 9,438,046 B1 | 9/2016 | Leabman |
| 9,444,283 B2 | 9/2016 | Son et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,521,926 B1 | 12/2016 | Leabman et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,787,103 B1 | 10/2017 | Leabman et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,812,890 B1 | 11/2017 | Leabman et al. |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,201 B1 | 12/2017 | Leabman et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,458 B1 | 12/2017 | Bell et al. |
| 9,853,485 B2 | 12/2017 | Contopanagos |
| 9,853,692 B1 | 12/2017 | Bell et al. |
| 9,859,756 B2 | 1/2018 | Leabman et al. |
| 9,859,757 B1 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,871,387 B1 | 1/2018 | Bell et al. |
| 9,871,398 B1 | 1/2018 | Leabman |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,395 B1 | 1/2018 | Leabman et al. |
| 9,882,427 B2 | 1/2018 | Leabman et al. |
| 9,882,430 B1 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,535 B2 | 2/2018 | Leabman |
| 9,893,538 B1 | 2/2018 | Bell et al. |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |

(56) References Cited

U.S. PATENT DOCUMENTS

| | | |
|---|---|---|
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,075,017 B2 | 9/2018 | Leabman et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,116,143 B1 | 10/2018 | Leabman et al. |
| 10,116,162 B2 | 10/2018 | Hosseini et al. |
| 10,116,170 B1 | 10/2018 | Leabman |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,148,133 B2 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B1 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,491,029 B2 | 11/2019 | Hosseini |
| 10,498,144 B2 | 12/2019 | Leabman et al. |
| 10,511,097 B2 | 12/2019 | Kornaros et al. |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,992,185 B2 | 4/2021 | Leabman |
| 10,992,187 B2 | 4/2021 | Leabman |
| 11,011,942 B2 | 5/2021 | Liu |
| 11,018,779 B2 | 5/2021 | Sarajedini |
| 11,056,929 B2 | 7/2021 | Bell et al. |
| 11,114,885 B2 | 9/2021 | Hosseini et al. |
| 11,159,057 B2 | 10/2021 | Kabiri et al. |
| 11,233,425 B2 | 1/2022 | Leabman |
| 11,245,191 B2 | 2/2022 | Kornaros et al. |
| 11,342,798 B2 | 5/2022 | Johnston et al. |
| 11,437,735 B2 | 9/2022 | Papio-Toda et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |

(56) References Cited

U.S. PATENT DOCUMENTS

| | | |
|---|---|---|
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0056855 A1 | 3/2006 | Nakagawa et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0184705 A1* | 8/2006 | Nakajima ......... H04N 1/00278 348/E5.042 |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0099644 A1 | 5/2007 | Batra et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0174604 A1 | 7/2009 | Keskitalo |
| 2009/0180653 A1 | 7/2009 | Sjursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |

(56) References Cited

U.S. PATENT DOCUMENTS

| | | |
|---|---|---|
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0069112 A1* | 3/2010 | Sun ............... H04W 74/085 455/553.1 |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aioi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |

(56) References Cited

U.S. PATENT DOCUMENTS

| | | |
|---|---|---|
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0312446 A1 | 12/2012 | Hood |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |

(56) References Cited

U.S. PATENT DOCUMENTS

| | | |
|---|---|---|
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117921 A1 | 5/2014 | Suomela |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175876 A1 | 6/2014 | Cheatham, III et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |

(56) References Cited

U.S. PATENT DOCUMENTS

| | | |
|---|---|---|
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292269 A1 | 10/2014 | Keating et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0370929 A1 | 12/2014 | Khawand et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0087228 A1* | 3/2015 | Porat .............. H04B 5/0093 455/41.1 |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0139124 A1* | 5/2015 | Da .................. H04W 52/244 370/329 |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |

(56) References Cited

U.S. PATENT DOCUMENTS

| | | |
|---|---|---|
| 2016/0005068 A1 | 1/2016 | Im et al. |
| 2016/0012695 A1 | 1/2016 | Bell et al. |
| 2016/0013560 A1 | 1/2016 | Daniels |
| 2016/0013677 A1 | 1/2016 | Bell et al. |
| 2016/0013855 A1 | 1/2016 | Campos |
| 2016/0020636 A1 | 1/2016 | Khlat |
| 2016/0020831 A1* | 1/2016 | Hamada ............... H02J 50/80 320/108 |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0064959 A1* | 3/2016 | Jung ..................... G06F 1/28 320/162 |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1* | 4/2016 | Leabman ............... H04W 4/80 307/104 |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III et al. |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0118714 A1 | 4/2017 | Kaechi |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0248409 A1 | 8/2018 | Johnston |
| 2018/0262050 A1 | 9/2018 | Yankowitz |
| 2018/0309314 A1 | 10/2018 | White et al. |
| 2018/0343040 A1 | 11/2018 | Luzinski et al. |
| 2019/0052979 A1 | 2/2019 | Chen et al. |
| 2019/0074133 A1 | 3/2019 | Contopanagos |
| 2019/0131827 A1 | 5/2019 | Johnston |
| 2019/0296586 A1 | 9/2019 | Moshfeghi |
| 2019/0393729 A1 | 12/2019 | Contopanagos et al. |
| 2019/0393928 A1 | 12/2019 | Leabman |
| 2020/0112204 A1 | 4/2020 | Hosseini et al. |
| 2020/0244104 A1 | 7/2020 | Katajamaki et al. |
| 2020/0244111 A1 | 7/2020 | Johnston et al. |

FOREIGN PATENT DOCUMENTS

| | | |
|---|---|---|
| CN | 201278367 Y | 7/2009 |
| CN | 101507044 A | 8/2009 |
| CN | 102027690 A | 4/2011 |
| CN | 102089952 A | 6/2011 |
| CN | 102227884 A | 10/2011 |
| CN | 102292896 A | 12/2011 |
| CN | 102860037 A | 1/2013 |
| CN | 103151848 A | 6/2013 |
| CN | 103348563 A | 10/2013 |
| CN | 103594776 A | 2/2014 |
| CN | 104040789 A | 9/2014 |
| CN | 203826555 U | 9/2014 |
| CN | 104090265 A | 10/2014 |
| CN | 104167773 A | 11/2014 |
| CN | 104347915 A | 2/2015 |
| CN | 104584449 A | 4/2015 |
| CN | 105762946 A | 7/2016 |
| CN | 105765821 A | 7/2016 |
| CN | 105932407 A | 9/2016 |
| CN | 106329116 A | 1/2017 |
| CN | 103380561 B | 9/2017 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002209343 A | 7/2002 |
| JP | 2002319816 A | 10/2002 |
| JP | 2006157586 A | 6/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2009525715 A | 7/2009 |
| JP | 2009201328 A | 9/2009 |
| JP | 2009247125 A | 10/2009 |

(56) References Cited

FOREIGN PATENT DOCUMENTS

| | | | |
|---|---|---|---|
| JP | 2009253649 A | 10/2009 | |
| JP | 2011514781 A | 5/2011 | |
| JP | 2012016171 A | 1/2012 | |
| JP | 2012023950 A | 2/2012 | |
| JP | 2012095226 A | 5/2012 | |
| JP | 2012157167 A | 8/2012 | |
| JP | 2013099249 A | 5/2013 | |
| JP | 2013162624 A | 8/2013 | |
| JP | 2013169106 A | 8/2013 | |
| JP | 2014501080 A | 1/2014 | |
| JP | 2014075927 A | 4/2014 | |
| JP | 2014112063 A | 6/2014 | |
| JP | 2014176131 A | 9/2014 | |
| JP | 2014179746 A | 9/2014 | |
| JP | 2014223018 A | 11/2014 | |
| JP | 2015027345 A | 2/2015 | |
| JP | 2015128349 A | 7/2015 | |
| JP | 2015128370 A | 7/2015 | |
| JP | 2017077093 A | 4/2017 | |
| JP | WO2015177859 A1 | 4/2017 | |
| JP | 2017085682 A | 5/2017 | |
| KR | 20060061776 A | 6/2006 | |
| KR | 20070044302 A | 4/2007 | |
| KR | 100755144 B1 | 9/2007 | |
| KR | 20110132059 A | 12/2011 | |
| KR | 20110135540 A | 12/2011 | |
| KR | 20120009843 A | 2/2012 | |
| KR | 20120108759 A | 10/2012 | |
| KR | 20130026977 A | 3/2013 | |
| KR | 20140023409 A | 2/2014 | |
| KR | 20140023410 A | 3/2014 | |
| KR | 20140085200 A | 7/2014 | |
| KR | 20150077678 A | 7/2015 | |
| RU | 2658332 C1 | 6/2018 | |
| WO | WO 199508125 A1 | 3/1995 | |
| WO | WO 199831070 A1 | 7/1998 | |
| WO | WO 199952173 A1 | 10/1999 | |
| WO | WO 2000111716 A1 | 2/2001 | |
| WO | WO 2003091943 A1 | 11/2003 | |
| WO | WO 2004077550 A1 | 9/2004 | |
| WO | WO 2006122783 A2 | 11/2006 | |
| WO | WO 2007070571 A2 | 6/2007 | |
| WO | WO 2008024993 A2 | 2/2008 | |
| WO | WO 2008156571 A2 | 12/2008 | |
| WO | WO 2010022181 A1 | 2/2010 | |
| WO | WO 2010039246 A1 | 4/2010 | |
| WO | WO 2010116441 A1 | 10/2010 | |
| WO | WO 2010138994 A1 | 12/2010 | |
| WO | WO 2011112022 A2 | 9/2011 | |
| WO | WO 2012177283 A1 | 12/2012 | |
| WO | WO 2013031988 A1 | 3/2013 | |
| WO | WO 2013035190 A1 | 3/2013 | |
| WO | WO 2013038074 A2 | 3/2013 | |
| WO | WO 2013042399 A1 | 3/2013 | |
| WO | WO 2013052950 A1 | 4/2013 | |
| WO | WO 2013105920 A2 | 7/2013 | |
| WO | WO 2013175596 A1 | 11/2013 | |
| WO | WO 2014068992 A1 | 5/2014 | |
| WO | WO 2014075103 A1 | 5/2014 | |
| WO | WO 2014113093 A1 | 7/2014 | |
| WO | WO 2014132258 A1 | 9/2014 | |
| WO | WO 2014134996 A1 | 9/2014 | |
| WO | WO 2014156465 A1 | 10/2014 | |
| WO | WO 2014182788 A2 | 11/2014 | |
| WO | WO 2014182788 A3 | 11/2014 | |
| WO | WO 2014197472 A1 | 12/2014 | |
| WO | WO 2014209587 A1 | 12/2014 | |
| WO | WO 2015038773 A1 | 3/2015 | |
| WO | WO 2015097809 A1 | 7/2015 | |
| WO | WO 2015130902 A1 | 9/2015 | |
| WO | WO 2015161323 A1 | 10/2015 | |
| WO | WO 2016024869 A1 | 2/2016 | |
| WO | WO 2016048512 A1 | 3/2016 | |
| WO | WO 2016088261 A1 | 6/2016 | |
| WO | WO 2016187357 A1 | 11/2016 | |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.

(56) References Cited

OTHER PUBLICATIONS

Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.

(56) References Cited

OTHER PUBLICATIONS

Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/015450, May 18, 2020, 8 pgs.
Energous Corp., ISRWO, PCT/US2020/016975, May 15, 2020, 15 pgs.
Energous Corp., ISRWO, PCT/US2020/027409, Jul. 24, 2020, 11 pgs.
Notice of Intent to Issue Reexam Certificate: 90/013793 Feb. 2, 2017, 8 pgs.
Order Granting Reexamination Request, U.S. Appl. No. 90/013,793 Aug. 31, 2016, 23 pgs.
Ossia Inc. vs Energous Corp., Declaration of Stephen B. Heppe in Support of Petition for Post-Grant Review of U.S. Pat. No. 9,124,125, PGR2016-00023, May 31, 2016, 144 pgs.
Ossia Inc. vs Energous Corp., Declaration of Stephen B. Heppe in Support of Petition for Post-Grant Review of U.S. Pat. No. 9,124,125, PGR2016-00024, May 31, 2016, 122 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Pat. No. 9,124,125, May 31, 2016, 86 pgs.
Ossia Inc. vs Energous Corp., Petition for Post-Grant Review of U.S. Pat. No. 9,124,125, May 31, 2016, 92 pgs.
Ossia Inc. vs Energous Corp., PGR2016-00023—Institution Decision, Nov. 29, 2016, 29 pgs.
Ossia Inc. vs Energous Corp., PGR2016-00024—Institution Decision, Nov. 29, 2016, 50 pgs.
Ossia Inc. vs Energous Corp., PGR2016-00024—Judgement-Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205,5, dated Apr. 7, 2017, 9 pgs.
Extended European Search Report, EP16880139.7, dated Jul. 12, 2019, 5 pgs.
Extended European Search Report, EP16880153.8, dated Jul. 2, 2019, 9 pgs.
Extended European Search Report, EP16880158.7, dated Jul. 15, 2019, 8 pgs.
Extended European Search Report, EPl6882597,4, dated Aug. 7, 2019, 9 pgs.
Extended European Search Report, EP16882696.4, dated Jul. 3, 2019, 10 pgs.
Extended European Search Report, EP17840412.5, dated Jul. 15, 2019, 8 pgs.
Extended European Search Report, EP17882087.4, dated Sep. 17, 2019, 10 pgs.
Extended European Search Report, EPl8204043,6, dated Feb. 14, 2019, 5 pgs.
Extended European Search Report, EP18797695.6, dated Nov. 19, 2020, 9 pgs.
Extended European Search Report, EP19214719.7, dated Jan. 17, 2020, 9 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas And Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Anten-

(56) References Cited

OTHER PUBLICATIONS nas and Propagation Society International Symposium, Toronto, ON, 2010, 4 pgs.

* cited by examiner

400

SYSTEMS AND METHODS FOR MANAGING COEXISTENCE OF WIRELESS-POWER SIGNALS AND DATA SIGNALS OPERATING IN A SAME FREQUENCY BAND

RELATED APPLICATIONS

This application is a continuation of U.S. patent application Ser. No. 16/174,172, filed Oct. 29, 2018, entitled "Systems And Methods For Managing Coexistence Of Wireless-Power Signals And Data Signals Operating In A Same Frequency Band," which claims the benefit of U.S. Provisional Patent Application Ser. 62/579,049, filed Oct. 30, 2017, entitled "Systems and Methods for Managing Coexistence of Wireless-Power-Transmission Signals and Data-Communication Signals Operating In A Same Frequency Band," each of which is herein fully incorporated by reference in its respective entirety.

TECHNICAL FIELD

The present disclosure relates generally to wireless power transmission, and more particularly, to systems and methods for managing coexistence of wireless-power-transmission signals and data-communication signals.

BACKGROUND

Portable electronic devices, such as laptop computers, mobile phones, tablets, and other electronic devices, require frequent charging of a power-storing component (e.g., a battery) to operate. Many electronic devices require charging one or more times per day. Often, charging an electronic device requires manually connecting an electronic device to an outlet or other power source using a wired charging cable. In some cases, the power-storing component is removed from an electronic device and inserted into charging equipment. Such charging is time consuming, burdensome, and inefficient because it often requires users to carry around multiple charging cables and/or other charging devices, and frequently requires users to locate appropriate power sources, e.g., wall outlets, to charge their electronic devices. Additionally, conventional charging techniques potentially deprive a user of the ability to use the device while it is charging, and/or require the user to remain next to a wall outlet or other power source to which their electronic device or other charging equipment is connected.

One way to address this issue is to wirelessly transmit power to an electronic device via a certain medium, such as radio frequency band(s). Wireless power transmission can use a frequency band that is different from the one used by wireless data communication system to avoid interference. However, there are situations where wireless power transmission shares the same frequency band(s) as wireless data communication to transfer wireless-power signals. As the transmission medium is shared, contention between wireless-power transmission and wireless data communication can result in interference, which reduces the performance or results in denial of these services.

SUMMARY

Accordingly, it would be desirable to provide a mechanism for coexistence and to mitigate the interference between wireless power transmission and data communications systems in the same frequency band. The method and system for wireless power transmission disclosed herein effectively mitigate the interference between the wireless power transmission and wireless data communication. For example, a wireless-power-transmitting device can transmit wireless power during inactive time periods of wireless data communications.

In some embodiments, there is no wireless power transmission when the communication controller of the wireless-power-transmitting device indicates there is data traffic based on coexistence signals generated from communication controller (e.g. Hardware (HW) Packet Timing Arbitration (PTA) signals from Bluetooth Low Energy (BLE) controller). In some embodiments, there is no wireless power transmission when there are programmed data traffic patterns (e.g., traffic profiles) from power profile protocol, such as a set of commands from communication controller to power controller. In some embodiments, the data traffic patterns include:

1) parameters such as period, window size, offset, and priority of traffic patterns (e.g. BT Synchronous connection-oriented (SCO)/enhanced SCO/sniff packet types, BLE connection events, Zigbee Beacon);
2) traffic synchronization and drift compensation (e.g., alignment of traffic profiles from different devices to a common time domain);
3) setting power profiles from devices at different hops (e.g., data traffic between power receiving device and another device); and
4) channel assessment of frequency band (e.g., determination of affect frequency band).

In some embodiments, there is also no wireless power transmission during adjustable time margin between power transmission and data communication.

In some embodiments, interference between the wireless power transmission and wireless data communication can be mitigated while maintaining Quality of Service (QoS) for power transmission and data communication by (1) categorizing and prioritizing different data communication traffic profiles (e.g., prioritization between audio/video data and bulk data transmission); (2) creating policy for prioritizing wireless-power transmission over data communication, and vice versa (e.g., maintaining a minimum charge rate over low priority bulk data transmission; and (3) shaping traffic profiles for wireless power and data frames by modulating power against combined data traffic profiles.

In some embodiments, interference mitigation between the wireless power transmission and wireless data communication further includes modulating power control and adjusting levels of power transmission in the same frequency band, such as lowering charging rate in exchange for reduced interference.

(A1) In some embodiments, a method is performed at a wireless-power-transmitting device having one or more antennas configured to transmit wireless-power signals, one or more processors, and a wireless data transceiver. The method includes: detecting that a wireless-power-receiving device is located in proximity to the wireless-power-transmitting device. After detecting that the wireless-power-receiving device is located in proximity to the wireless-power-transmitting device, the method includes establishing a data-traffic profile associated with the wireless-power-receiving device, the data-traffic profile including identifications of data signals to be exchanged over a predetermined frequency band between the wireless-power-receiving device and the wireless-power-transmitting device using the wireless data transceiver. The method further includes determining, by the one or more processors, windows of time during which to transmit wireless-power signals over the predetermined frequency band to the wireless-power-receiving device based on the data-traffic profile. At the determined windows of time, the method also includes transmitting, by the one or more antennas, wireless-power signals over the predetermined frequency band to the wireless-power-receiving device.

(A2) In some embodiments of the method of A1, the identifications of data signals to be exchanged include information identifying a respective data type for each respective data signal, and a point in time at which each respective data signal is to be exchanged.

(A3) In some embodiments of any one of A1-A2, the establishing the data-traffic profile comprises categorizing the data signals based on each of the respective data types for each of the data signals; and determining respective priority levels for each of the data signals.

(A4) In some embodiments of any one of A1-A3, the windows of time during which to transmit wireless-power signals to the wireless-power-receiving device are windows of time during which no data signals with a high priority level are to be exchanged.

(A5) In some embodiments of any one of A1-A4, the method further includes while transmitting wireless-power signals during a respective window of time, in accordance with a determination that data signals with a high priority level are to be exchanged during the respective window of time, suspending transmission of wireless-power signals to the wireless-power-receiving device.

(A6) In some embodiments of any one of A1-A5, the method further includes in accordance with a determination that a charge level of the wireless-power-receiving device is less than a charge-level threshold, resuming the transmission of wireless-power signals to the wireless-power-receiving device.

(A7) In some embodiments of any one of A1-A6, the method further includes in conjunction with resuming the transmission of wireless-power signals, providing a notification to a user of the wireless-power-receiving device that receipt of data signals may be interrupted.

(A8) In some embodiments of any one of A1-A7, the resuming the transmission of wireless-power signals includes transmitting wireless-power signals while a data signal is being exchanged between the wireless-power-receiving device and another device, and the method further includes adjusting at least one transmission characteristic for the wireless-power signals to minimize interference with the data signal.

(A9) In some embodiments of any one of A1-A8, the adjusting is performed in accordance with a determination that exchange of the data signal has an error rate above a threshold error rate.

(A10) In some embodiments of any one of A1-A9, the adjusting is performed until the error rate falls below the threshold error rate.

(A11) In some embodiments of any one of A1-A10, the method further includes adjusting at least one transmission characteristic for the wireless-power signals based on respective priority levels of the data signals exchanged between the wireless-power transmitting device and the wireless-power-receiving device.

(A12) In some embodiments of any one of A1-A11, the at least one transmission characteristic is a power level.

(A13) In some embodiments of any one of A1-A12, the detecting that the wireless-power-receiving device is in proximity to the wireless-power-transmitting device includes detecting, using measurements of reflected power at the wireless-power transmitting device, that the wireless-power-receiving device has been placed within a predetermined distance of the wireless-power-transmitting device; and in response to detecting that the wireless-power-receiving device has been placed within the predetermined distance of the wireless-power-transmitting device and before establishing the data-traffic profile, transmitting, via the one or more antennas, wireless-power signals with default characteristics to the wireless-power-receiving device until the wireless-power-receiving device provides a wireless-power-control signal to the wireless-power-transmitting device. In some embodiments, the wireless-power-transmitting device uses the wireless-power-control signal to determine specific characteristics, distinct from the default characteristics, to use for transmitting wireless-power signals to the wireless-power-receiving device.

(A14) In some embodiments of any one of A1-A13, the identifications of data signals included in the data-traffic profile include identifications of wireless-power-control signals to be exchanged between the wireless-power-receiving device and the wireless-power-transmitting device, and the wireless-power-transmitting device uses the wireless-power-control signal to determine specific characteristics to use for transmitting wireless-power signals to the wireless-power-receiving device.

(A15) In some embodiments of any one of A1-A14, the identifications of data signals included in the data-traffic profile further include identifications of application-specific data signals to be exchanged between the wireless-power-receiving device and the wireless-power-transmitting device, wherein the application-specific data signals are associated with a software application executing on the wireless-power-receiving device.

(A16) In some embodiments of any one of A1-A15, the data-traffic profile also includes identifications of additional data signals to be exchanged between the wireless-power-transmitting device and an additional device other than the wireless-power-receiving device, the additional device being communicatively coupled to the wireless-power-transmitting device.

(A17) In some embodiments of any one of A1-A16, the additional device is a second wireless-power-receiving device, the additional data signals include wireless-power-control signals to be exchanged between the second wireless-power-receiving device and the wireless-power-transmitting device, and the wireless-power-transmitting device uses the wireless-power-control signals to determine specific characteristics to use for transmitting wireless-power signals to the second wireless-power-receiving device.

(A18) In some embodiments of any one of A1-A17, the additional data signals include application-specific data signals to be exchanged between the second wireless-power-receiving device and the wireless-power-transmitting device, and the application-specific data signals are associated with a software application that is executing on the second wireless-power-receiving device.

(A19) In some embodiments of any one of A1-A18, the data-traffic profile also includes identifications of application-specific data signals to be exchanged between the wireless-power-receiving device and a second device other than the wireless-power-transmitting device, the second device being communicatively coupled to the wireless-power-receiving device, and the application-specific data signals are associated with a software application executing on the wireless-power-receiving device.

(A20) In some embodiments of any one of A1-A19, the data signals are to be exchanged using a same frequency band as the plurality of power transmission signals.

(A21) In some embodiments of any one of A1-A20, the wireless-power-receiving device comprises circuitry for receiving and converting wireless-power signals into usable power, and an electronic device that is coupled to the circuitry, wherein the circuitry provides the usable power to the electronic device to provide operating power or charge a battery thereof.

(A22) In some embodiments of any one of A1-A21, the establishing the data-traffic profile includes receiving, via the one or more processors, information regarding at least some of the data signals from a controller associated with the wireless data transceiver.

(A23) In some embodiments of any one of A1-A22, an identification of a respective data signal of the data signals included in the data-traffic profile includes transmission characteristics for the respective data signal.

(B1) In some embodiments, a method is performed at a wireless-power transmitting device having a controller, a wireless communications component, and one or more antennas configured to transmit wireless-power signals to one or more wireless-power-receiving devices. The method includes: transmitting, via the one or more antennas, wireless-power signals to a wireless-power-receiving device that is located in proximity to the wireless-power transmitting device. The method further includes receiving, by the controller, information regarding transmission of data signals exchanged between the wireless-power transmitting device and the wireless-power-receiving device. The method also includes evaluating one or more characteristics associated with the data signals to determine whether transmission of wireless-power signals to the wireless-power-receiving device is prioritized over transmission of a respective data signal of the data signals, the one or more characteristics indicating that the respective data signal is to be transmitted during a first time period and during a second time period, distinct from the first time period. The method also includes, in accordance with a determination that transmission of the respective data signal is prioritized over transmission of wireless-power signals during the first time period, suspending the transmission of wireless-power signals to the wireless-power-receiving device during the first time period. The method further includes, in accordance with a determination that transmission of wireless-power signals is prioritized over transmission of the respective data signal during the second time period, resuming transmission of wireless-power signals to the wireless-power-receiving device during the second time period.

(B2) In some embodiments of B1, the data signals include one or more of: (1) a set of power control data signals including one or more parameters associated with transmission of the wireless-power signals and (2) a set of application data exchanged between the wireless-power-transmitting device and the first wireless-power-receiving device.

(B3) In some embodiments of B1 or B2, the method includes: after detecting that the wireless-power-receiving device is located in proximity to the wireless-power-transmitting device, the method includes establishing a data-traffic profile associated with the wireless-power-receiving device, the data-traffic profile including identifications of data signals to be exchanged over a predetermined frequency band between the wireless-power-receiving device and the wireless-power-transmitting device using the wireless data transceiver. The method further includes determining, by the one or more processors, windows of time during which to transmit wireless-power signals over the predetermined frequency band to the wireless-power-receiving device based on the data-traffic profile. At the determined windows of time, the method also includes transmitting, by the one or more antennas, wireless-power signals over the predetermined frequency band to the wireless-power-receiving device.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
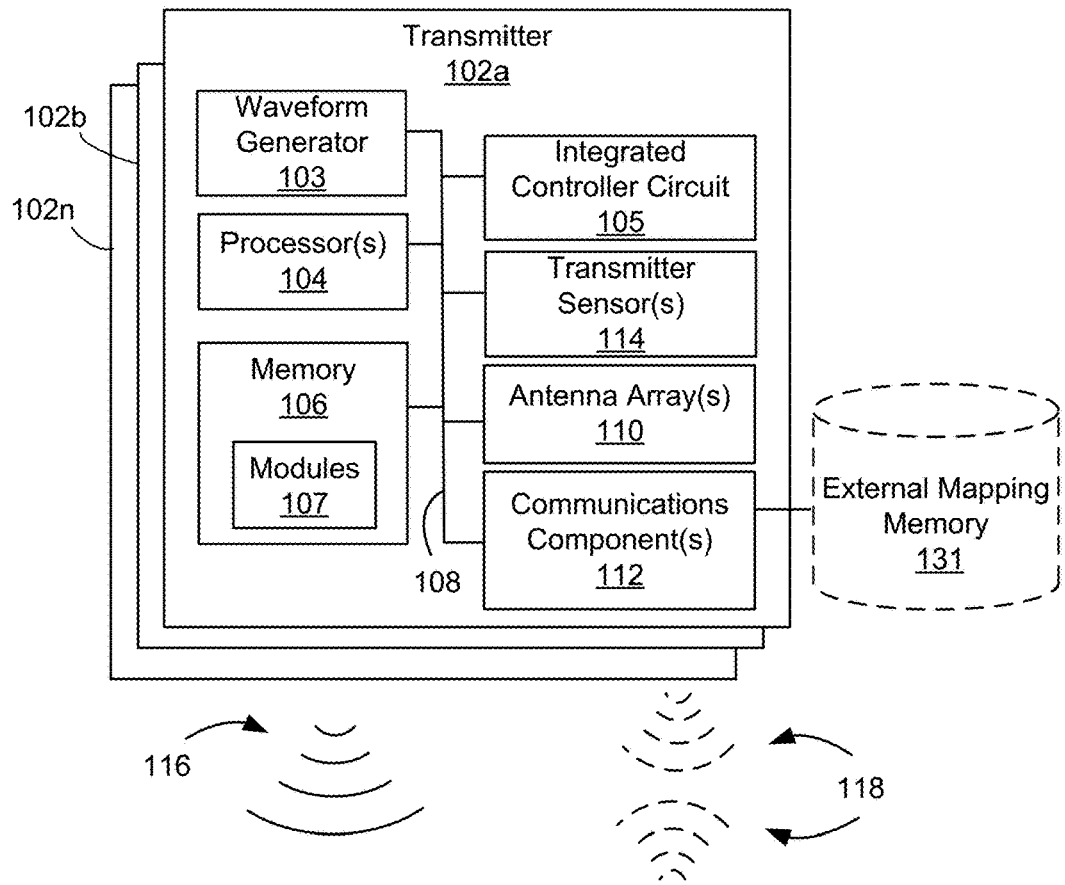
FIG. 1 is a block diagram of components of a representative wireless power transmission environment, in accordance with some embodiments.
Figure 1:
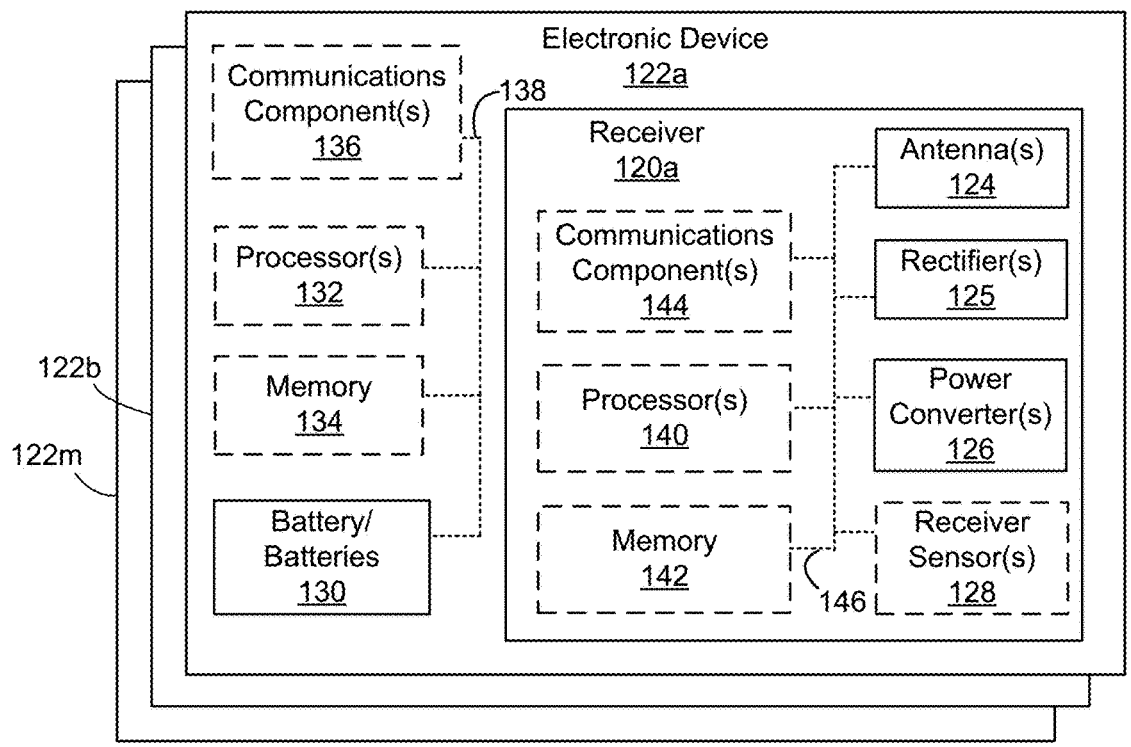

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Although some embodiments herein include the use of Radio Frequency (RF)-based wave transmission technologies as a primary example, it should be appreciated that the wireless charging techniques that might be employed are not be limited to RF-based technologies and transmission techniques. Rather, it should be appreciated that additional or alternative wireless charging techniques may be utilized, including any suitable technology and technique for wirelessly transmitting energy so that a receiver is capable of converting the transmitted energy to electrical power. Such technologies or techniques may transmit various forms of wirelessly transmitted energy including the following non-limiting examples: ultrasound, microwave, resonant and inductive magnetic fields, laser light, infrared, or other forms of electromagnetic energy.

In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the example receiver system is shown, in some embodiments, as a single unit comprising potentially multiple components, both for RF reception of power and for other power reception methods mentioned in this paragraph, the receiver system can comprise multiple receivers that are physically spread around a room rather than being in a compact regular structure.

FIG. 1 is a block diagram of components of wireless power transmission environment 100, in accordance with some embodiments. Wireless power transmission environment 100 includes, for example, transmitters 102 (e.g., transmitters 102a, 102b . . . 102n) and one or more receivers 120. In some embodiments, the wireless power transmission environment 100 includes a number of receivers 120, each of which is associated with a respective electronic device 122 (e.g., electronic devices 122a, 122b . . . 122m).

An example transmitter 102 (e.g., transmitter 102a) includes, for example, one or more processor(s) 104, memory 106, one or more antenna arrays 110, one or more communications components 112 (also referred to herein as a "wireless data transceiver"), and/or one or more transmitter sensors 114. In some embodiments, these components are interconnected by way of a communications bus 108. References to these components of transmitters 102 cover embodiments in which one or more than one of each of these components (and combinations thereof) are included.

In some embodiments, memory 106 stores one or more programs (e.g., sets of instructions) and/or data structures, collectively referred to as "modules" herein. In some embodiments, memory 106, or the non-transitory computer readable storage medium of memory 106 stores the following modules 107 (e.g., programs and/or data structures), or a subset or superset thereof:

- information received from receiver 120 (e.g., generated by receiver sensor 128 and then transmitted to the transmitter 102a);
- information received from transmitter sensor 114;
- an adaptive pocket-forming module that adjusts one or more power waves 116 transmitted by one or more transmitters 102; and/or
- a beacon transmitting module that transmits a communication signal 118 for detecting a receiver 120 (e.g., within a transmission field of the one or more transmitters 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, memory 106 stores a subset of the modules identified above. In some embodiments, an external mapping memory 131 that is communicatively connected to communications component 112 stores one or more modules identified above. Furthermore, the memory 106 and/or external mapping memory 131 may store additional modules not described above. In some embodiments, the modules stored in memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to memory 106 is implemented on processor(s) 104 of a server (not shown) that is communicatively coupled to one or more transmitters 102 and/or by a memory of electronic device 122 and/or receiver 120.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

Receiver 120 (e.g., a receiver of electronic device 122) receives wireless-power signals 116 and/or data communication signals 118 transmitted by transmitters 102. In some embodiments, receiver 120 includes one or more antennas 124 (e.g., antenna array including multiple antenna elements), rectifier 125, power converter 126, receiver sensor 128 and/or other components or circuitry (e.g., processor(s) 140, memory 142, and/or communications component(s) 144). In some embodiments, these components are interconnected by way of a communications bus 146. References to these components of receiver 120 cover embodiments in which one or more than one of each of these components (and combinations thereof) are included. Receiver 120 converts energy from received wireless-power signals 116 (e.g., power waves) into electrical energy to power and/or charge electronic device 122. For example, receiver 120 uses power converter 126 to convert captured energy from wireless-power waves 116 to alternating current (AC) electricity or direct current (DC) electricity usable to power and/or charge electronic device 122. Non-limiting examples of power converter 126 include rectifiers, rectifying circuits, power management integrated circuits (PMIC), voltage conditioners, among suitable circuitry and devices.

In some embodiments, receiver 120 is a standalone device that is detachably coupled to one or more electronic devices 122. For example, electronic device 122 has processor(s) 132 for controlling one or more functions of electronic device 122 and receiver 120 has processor(s) 140 for controlling one or more functions of receiver 120.

In some embodiments, receiver is a component of electronic device 122. For example, processor(s) 132 controls functions of electronic device 122 and receiver 120.

In some embodiments, electronic device 122 includes processor(s) 132, memory 134, communications component(s) 136, and/or battery/batteries 130. In some embodiments, these components are interconnected by way of a communications bus 138. In some embodiments, communications between electronic device 122 and receiver 120 occur via communications component(s) 136 and/or 144. In some embodiments, communications between electronic device 122 and receiver 120 occur via a wired connection between communications bus 138 and communications bus 146. In some embodiments, electronic device 122 and receiver 120 share a single communications bus.

In some embodiments, receiver 120 receives one or more wireless-power waves 116 directly from transmitter 102. In some embodiments, receiver 120 harvests power waves from one or more pockets of energy created by one or more wireless-power waves 116 transmitted by transmitter 102.

In some embodiments, after the wireless-power waves 116 are received and/or energy is harvested from a pocket of energy, circuitry (e.g., integrated circuits, amplifiers, rectifiers, PMICs and/or voltage conditioner) of the receiver 120 converts the energy of the wireless-power waves (e.g., radio frequency electromagnetic radiation) to usable power (i.e., electricity), which powers electronic device 122 and/or is stored to battery 130 of electronic device 122. In some embodiments, the usable power converted from the wireless-power waves 116 are stored in a battery (not shown) located in the receiver 120, or a battery (not shown) separate from the electronic device 122 and the receiver 120. In some embodiments, the rectifying circuit 125 of the receiver 120 translates the electrical energy from AC to DC for use by electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, receiver 120 is a component of an electronic device 122. In some embodiments, a receiver 120 is coupled (e.g., detachably coupled) to an electronic device 122. In some embodiments, electronic device 122 is a peripheral device of receiver 120. In some embodiments, electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into usable power for charging the electronic devices 122.

In some embodiments, one or more sets of antenna elements 124 connect with their respective rectifiers 125. There can be multiple rectifiers 125 connected to their respective set of antenna elements 124. For example, in different embodiments, two, four, eight, or sixteen antenna elements are coupled with one rectifier 125. The antenna elements 124 extract or harvest power wirelessly from the wireless power waves transmitted by one or more wireless power transmitters 102. In some embodiments, the antenna element(s) 124 include(s) antenna arm(s) and antenna ground plane(s).

The antenna elements 124 comprise any type of antenna capable of transmitting and/or receiving signals in frequency bands used by the transmitter. Furthermore, the antenna element 124 may be directional and/or omni-directional and include flat antenna elements, patch antenna elements, dipole antenna elements, and/or any other suitable antenna for wireless power transmission. Suitable antenna types may include, for example, patch antennas with heights from about ⅛ inch to about 6 inches and widths from about ⅛ inch to about 6 inches. The shape and orientation of antenna element 124 may vary in dependency of the desired features of receiver system 120; orientation may be flat in X, Y, and/or Z axis, as well as various orientation types and combinations in three dimensional arrangements. Antenna element 124 may be made from any suitable material that allows RF signal transmission with high efficiency, good heat dissipation and the like. The number of antenna elements 124 may vary in relation with the desired range and power transmission capability of the transmitter; the more antenna elements, the wider the range and the higher the power transmission capability.

Antenna element 124 may include suitable antenna types for operating in frequency bands such as 900 MHz, 2.5 GHz or 5.8 GHz as these frequency bands conform to Federal Communications Commission (FCC) regulations part 18 (industrial, scientific, and medical equipment). Antenna element 124 may operate in independent frequencies, allowing a multichannel operation of pocket-forming. In addition, antenna element 124 may be located in various surfaces of receiver 120. Antenna element 124 may operate in single array, pair array, quad array and any other suitable arrangement that may be designed in accordance with the desired application.

In some implementations, the entire side of a printed circuit board PCB or a RF integrated circuit (IC) may be closely packed with antenna element 124. The RFIC may connect to multiple antenna elements. Multiple antenna elements 124 may surround a single RFIC.

Rectifiers 125 of the receiver system 120 may include diodes, resistors, inductors, and/or capacitors to rectify alternating current (AC) voltage generated by antenna elements 124 to direct current (DC) voltage. Rectifiers 125 may be placed as close as is technically possible to antenna elements 124 to minimize losses in electrical energy gathered from power transmission signals. After rectifying AC voltage, the resulting DC voltage may be regulated using power converters (not shown). Power converters can be a DC-to-DC converter that may help provide a constant voltage output, regardless of input, to an electronic device, or as in this example receiver system 120, to a battery (e.g., the battery 130 of the electronic device 122, or a battery (not shown) included in the receiver 120, or a battery (not shown) separate from the electronic device 122 and the receiver 120). Typical voltage outputs can be from about 5 volts to about 10 volts. In some embodiments, power converter may include electronic switched mode DC-DC converters, which can provide high efficiency. In such embodiments, the receiver 120 may comprise a capacitor (not shown) that is situated to receive the electrical energy before power converters. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 120 to provide the extra energy required. Afterwards, lower power can be provided. For example, 1/80 of the total initial power that may be used while having the phone or laptop still build-up charge.

The current from the rectifiers 125 is provided to a Power Management Integrated Circuit (PMIC) (not shown). A PMIC is an integrated circuit and/or a system block in a system-on-a-chip device for managing power requirements of the host system. The PMIC may include battery management, voltage regulation, and charging functions. It may include a DC-to-DC converter to allow dynamic voltage scaling. In some implementations, the PMIC may provide up to a 95% power conversion efficiency. In some implementations, the PMIC may integrate with dynamic frequency scaling in a combination. The PMIC may be implemented in a battery-operated device such as mobile phones and/or portable media players. In some implementations, the battery 130 may be replaced with an input capacitor and an output capacitor. The PMIC may be directly connected to the battery 130 and/or capacitors. When the battery 130 is being charged directly, a capacitor may not be implemented. In some implementations, the PMIC may be coiled around the battery 130. The PMIC may comprise a power management chip (PMC) that acts as a battery charger, and is connected to the battery 130. The PMIC can use pulse-frequency modulation (PFM) and pulse-width modulation (PWM). It can use switching amplifier (Class-D electronic amplifier). In some implementations, an output converter, a rectifier, and/or a BLE may also be included in the PMIC.

In some embodiments, the one or more transmitters 102 adjust one or more characteristics (e.g., phase, gain, direction, and/or frequency) of power waves 116. For example, a transmitter 102 (e.g., transmitter 102a) selects a subset of one or more antenna elements of antenna array 110 to initiate transmission of power waves 116, cease transmission of power waves 116, and/or adjust one or more characteristics used to transmit power waves 116. In some implementations, the one or more transmitters 102 adjust power waves 116 such that trajectories of power waves 116 converge at a predetermined location within a transmission field (e.g., a location or region in space), resulting in controlled constructive or destructive interference patterns.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit and/or waveform generator, may control the behavior of the antennas. For example, based on the information received from the receiver by way of the communications signal 118, a controller circuit may determine a set of one or more characteristics or waveform characteristics (e.g., amplitude, frequency, trajectory, direction, phase, among other characteristics) used for transmitting the power waves 116 that would effectively provide power to the receiver 102 and electronic device 122. The controller circuit may also identify a subset of antennas from the antenna arrays 110 that would be effective in transmitting the wireless-power waves 116. As another example, a waveform generator circuit of the respective transmitter 102 coupled to the processor 104 may convert energy and generate the wireless-power waves 116 having the waveform characteristics identified by the controller, and then provide the power waves to the antenna arrays 110 for transmission.

In some embodiments, different subsets of antennas from the antenna arrays 110 are used to charge receivers 120 or electronic devices 122 at different locations. In some embodiments, different subsets of antennas with different frequencies from the antenna arrays 110 are used to charge receivers 120 or electronic devices 122 at different locations, e.g., each receiver 120 or electronic device 122 receives a particular frequency from a subset of antennas from the antenna arrays 110. In some embodiments, the frequencies from the different subsets of antennas are non-overlapping. In some embodiments, different subsets of antennas from the antenna arrays 110 are used to form pockets of energy around receivers 120 or electronic devices 122 at different locations.

In some embodiments, constructive interference of power waves occurs when two or more power waves 116 are in phase with one another and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs. In some embodiments, largest dimension of the pocket of energy created by the constructive interference patterns is more than 5 millimeters (mm), more than 10 mm, more than 15 mm, more than 20 mm, more than 50 mm, more than 100 mm, more than 500 mm, more than 1000 mm, more than 2000 mm, or more than 5000 mm. In some embodiments, the largest dimension of the pocket of energy created by the constructive interference patterns for a particular transmitted frequency is more than half of a wavelength, more than one wavelength, more than 5 wavelengths, more than 10 wavelengths, more than 100 wavelengths, more than 1000 wavelengths, or more than 10000 wavelengths.

In some embodiments, destructive interference of power waves occurs when two or more power waves are out of phase and converge into a combined wave such that the amplitude of the combined wave is less than the amplitude of a single one of the power waves. For example, the power waves "cancel one another out," thereby diminishing the amount of energy concentrated at a location in the transmission field. In some embodiments, destructive interference is used to generate a negligible amount of energy or "null" at a location within the transmission field where the power waves converge. In some embodiments, the "null" space is created adjacent to the pockets of energy formed by the constructive interference patterns. In some embodiments, largest dimension of the "null" space created by the destructive interference patterns is more than 5 mm, more than 10 mm, more than 15 mm, more than 20 mm, more than 50 mm, more than 100 mm, more than 500 mm, more than 1000 mm, more than 2000 mm, or more than 5000 mm. In some embodiments, the largest dimension of the "null" space created by the destructive interference patterns for a particular transmitted frequency is more than half of a wavelength, more than one wavelength, more than 5 wavelengths, more than 10 wavelengths, more than 100 wavelengths, more than 1000 wavelengths, or more than 10000 wavelengths.

In some embodiments, the one or more transmitters 102 transmit power waves 116 that create two or more discrete transmission fields (e.g., overlapping and/or non-overlapping discrete transmission fields). In some embodiments, a first transmission field is managed by a first processor 104 of a first transmitter (e.g. transmitter 102a) and a second transmission field is managed by a second processor 104 of a second transmitter (e.g., transmitter 102b). In some embodiments, the two or more discrete transmission fields (e.g., overlapping and/or non-overlapping) are managed by the transmitter processors 104 as a single transmission field.

In some embodiments, communications component 112 transmits communication signals 118 by way of a wired and/or wireless communication connection to receiver 120. In some embodiments, communications component 112 generates communications signals 118 used for triangulation of receiver 120. In some embodiments, communication signals 118 are used to convey information between transmitter 102 and receiver 120 for adjusting one or more characteristics used to transmit the power waves 116. In some embodiments, communication signals 118 include information related to data-traffic profile associated with one or more receivers 120, status, efficiency, user data, power consumption, billing, geo-location, relative location, and other types of information.

In some embodiments, receiver 120 includes a transmitter (not shown), or is a part of a transceiver, that transmits communications signals 118 to communications component 112 of transmitter 102.

In some embodiments, communications component 112 (e.g., communications component 112 of transmitter 102a) includes a communications component antenna for communicating with receiver 120 and/or other transmitters 102 (e.g., transmitters 102b through 102n). In some embodiments, these communications signals 118 represent a distinct channel of signals transmitted by transmitter 102, independent from a channel of signals used for transmission of the power waves 116.

In some embodiments, the receiver 120 includes a receiver-side communications component 144 configured to communicate various types of data with one or more of the transmitters 102, through a respective communications signal 118 generated by the receiver-side communications component. The data may include location indicators for the receiver 102 and/or electronic device 122, a power status of the device 122, status information for the receiver 102, status information for the electronic device 122, status information about the power waves 116, and/or status information for pockets of energy. In other words, the receiver 102 may provide data to the transmitter 102, by way of the communications signal 118, regarding the current operation of the system 100, including: information identifying a present location of the receiver 102 or the device 122, an amount of energy received by the receiver 120, and an amount of power received and/or used by the electronic device 122, among other possible data points containing other types of information.

In some embodiments, the data contained within communications signals 118 is used by electronic device 122, receiver 120, and/or transmitters 102 for determining adjustments of the one or more characteristics used by the antenna array 110 to transmit the power waves 116. Using a communications signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, receiver 120 uses a communications signal 118 to communicate data for, e.g., alerting transmitters 102 that the receiver 120 has entered or is about to enter a transmission field, provide information about electronic device 122, provide user information that corresponds to electronic device 122, indicate the effectiveness of received power waves 116, and/or provide updated characteristics or transmission parameters that the one or more transmitters 102 use to adjust transmission of the power waves 116.

As an example, the communications component 112 of the transmitter 102 communicates (e.g., transmits and/or receives) one or more types of data (including, e.g., authentication data and/or transmission parameters) including various information such as a beacon message, a transmitter identifier, a device identifier for an electronic device 122, a user identifier, a charge level for electronic device 122, a location of receiver 120 in a transmission field, and/or a location of electronic device 122 in a transmission field.

In some embodiments, transmitter sensor 114 and/or receiver sensor 128 detect and/or identify conditions of electronic device 122, receiver 120, transmitter 102, and/or a transmission field. In some embodiments, data generated by transmitter sensor 114 and/or receiver sensor 128 is used by transmitter 102 to determine appropriate adjustments to the one or more characteristics used to transmit the power waves 106. Data from transmitter sensor 114 and/or receiver sensor 128 received by transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, receiver sensor 128 is a gyroscope that provides raw data such as orientation data (e.g., tri-axial orientation data), and processing this raw data may include determining a location of receiver 120 and/or or a location of receiver antenna 124 using the orientation data.

In some embodiments, receiver sensor 128 includes one or more infrared sensors (e.g., that output thermal imaging information), and processing this infrared sensor data includes identifying a person (e.g., indicating presence of the person and/or indicating an identification of the person) or other sensitive object based upon the thermal imaging information.

In some embodiments, receiver sensor 128 includes a gyroscope and/or an accelerometer that indicates an orientation of receiver 120 and/or electronic device 122. As one example, transmitters 102 receive orientation information from receiver sensor 128 and the transmitters 102 (or a component thereof, such as the processor 104) use the received orientation information to determine whether electronic device 122 is flat on a table, in motion, and/or in use (e.g., next to a user's head).

In some embodiments, receiver sensor 128 is a sensor of electronic device 122 (e.g., an electronic device 122 that is remote from receiver 102). In some embodiments, receiver 120 and/or electronic device 122 includes a communication system for transmitting signals (e.g., sensor signals output by receiver sensor 128) to transmitter 102.

Non-limiting examples of transmitter sensor 114 and/or receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for transmitter sensor 114 and/or receiver sensor 128 include binary sensors that acquire stereoscopic sensor data, such as the location of a human or other sensitive object.

In some embodiments, transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, transmitters 102 adjust one or more characteristics used to transmit the power waves 116 to ensure compliance with electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for maximum permissible exposure (MPE), and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In some embodiments, output from transmitter sensor 114 and/or receiver sensor 128 is used by transmitter 102 to detect whether a person or other sensitive object enters a power transmission region (e.g., a location within a predetermined distance of a transmitter 102, power waves generated by transmitter 102, and/or a pocket of energy). In some embodiments, in response to detecting that a person or other sensitive object has entered the power transmission region, the transmitter 102 adjusts one or more power waves 116 (e.g., by ceasing power wave transmission, reducing power wave transmission, and/or adjusting the one or more characteristics of the power waves). In some embodiments, in response to detecting that a person or other sensitive object has entered the power transmission region, the transmitter 102 activates an alarm (e.g., by transmitting a signal to a loudspeaker that is a component of transmitter 102 or to an alarm device that is remote from transmitter 102). In some embodiments, in response to detecting that a person or other sensitive object has entered a power transmission region, the transmitter 102 transmits a digital message to a system log or administrative computing device.

In some embodiments, antenna array 110 includes multiple antenna elements (e.g., configurable "tiles") collectively forming an antenna array. Antenna array 110 generates power transmission signals, e.g., RF power waves, ultrasonic power waves, infrared power waves, and/or magnetic resonance power waves. In some embodiments, the antennas of an antenna array 110 (e.g., of a single transmitter, such as transmitter 102a, and/or of multiple transmitters, such as transmitters 102a, 102b, . . . , 102n) transmit two or more power waves that intersect at a defined location (e.g., a location corresponding to a detected location of a receiver 120), thereby forming a pocket of energy (e.g., a concentration of energy) at the defined location.

In some embodiments, transmitter 102 assigns a first task to a first subset of antenna elements of antenna array 110, a second task to a second subset of antenna elements of antenna array 110, and so on, such that the constituent antennas of antenna array 110 perform different tasks (e.g., determining locations of previously undetected receivers 120 and/or transmitting power waves 116 to one or more receivers 120). As one example, in an antenna array 110 with ten antennas, nine antennas transmit power waves 116 that form a pocket of energy and the tenth antenna operates in conjunction with communications component 112 to identify new receivers in the transmission field. In another example, an antenna array 110 having ten antenna elements is split into two groups of five antenna elements, each of which transmits power waves 116 to two different receivers 120 in the transmission field.

Figure 2:
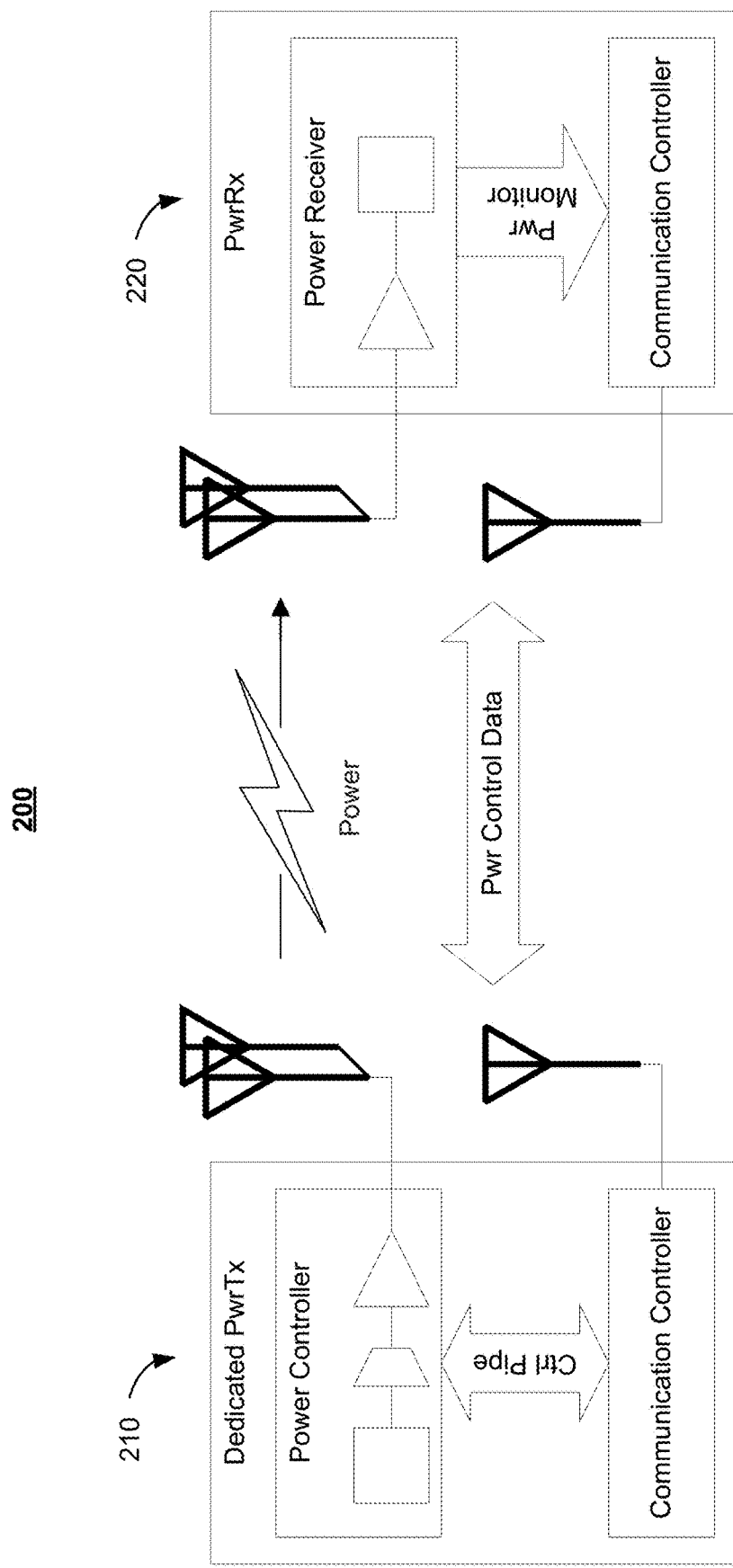
FIG. 2 is a block diagram of an example wireless power transmission system, in accordance with some embodiments.

FIG. 2 is a block diagram of an example wireless power transmission system 200, in accordance with some embodiments. In some embodiments, the wireless power transmission system includes a wireless-power transmitter 210 (e.g., "PwrTx") in communication with a wireless-power receiver 220 (e.g., "PwrRx"). In some embodiments, the wireless-power transmitter 210 transmits wireless-power signals (e.g., "Power") via a frequency band to power the wireless-power receiver 220 and/or to charge a battery of the wireless-power receiver 220. In some embodiments, the wireless-power transmitter 210 exchanges wireless data signals with the wireless-power receiver 220, including power control data (e.g., "Pwr Control Data") for managing the wireless-power transmission between the wireless-power transmitter 210 and the wireless-power receiver 220. In some embodiments, the wireless-power signals are transmitted using the same frequency band as the wireless data signals between the wireless-power transmitter 210 and the wireless-power receiver 220.

In some embodiments, the wireless-power receiver 220 is the same as the receiver 120 as discussed with reference to FIG. 1. In some embodiments, the wireless-power receiver 220 includes a power receiver unit (e.g., "Power Receiver" including rectifier 125 and power converter 126 of FIG. 1) that converts wireless-power signals received from the transmitter 210 into electric power. In some embodiments, the wireless-power receiver 220 monitors the wireless-power signals received at the receiver 220, and the receiver 220 further includes a communication controller that communicates with the transmitter 210 regarding one or more characteristics of the wireless-power signals received at the receiver 220 and responds to commands received from the transmitter 210. In some embodiments, the antenna(s) of the receiver 220 used for receiving the wireless-power signals are separate from the antenna(s) used for communicating the wireless data signals with the transmitter 210. Alternatively, the antenna(s) of the receiver 220 used for receiving the wireless-power signals are the same as the antenna(s) used for communicating the wireless data signals with the transmitter 210.

In some embodiments, the wireless-power transmitter 210 is the same as the transmitter 102 as discussed with reference to FIG. 1. In some embodiments, the wireless-power transmitter 210 may support one or more wireless-power receivers simultaneously. In some embodiments, the wireless-power transmitter 210 includes a power controller configured to generate wireless-power signals for transmission at a certain frequency band and to control the modulation and power level of the wireless-power signals. In some embodiments, the wireless-power transmitter 210 further includes a communication controller that establishes and maintains a communication channel with the wireless-power receiver 220 for exchanging wireless power control data (e.g., "Pwr Control Data") with the receiver 220 to control and monitor the wireless-power transmissions. For example, the communication controller of the transmitter 210 can receive one or more characteristics of the wireless-power signals generated by the power controller via the control pipe as shown in FIG. 2. In another example, the communication controller can receive commands from the wireless-power receiver 220 (e.g., "Pwr Control Data" including requests to adjust the wireless-power signals to be received at the receiver 220), and then send controlling commands to the power controller via the control pipe to adjust one or more characteristics of the wireless-power signals in accordance with the requests received from the receiver 220.

In some embodiments, the wireless power transmission system as shown in FIG. 2 is a dedicated wireless power transmission system including a dedicated wireless-power transmitter 210 (e.g., "Dedicated PwrTx"), because the Communication Controller of the transmitter 210 is used to establish a control channel between the transmitter 210 and the receiver 220 to control and monitor the wireless-power and data communications in-between (e.g., over the control pipe). The Communication Controller of the transmitter 210 does not receive or transmit other types of data, such as application data (as discussed elsewhere herein). In some embodiments, the antenna(s) of the transmitter 210 used for transmitting the wireless-power signals are separate from the antenna(s) used for communicating the wireless data signals with the receiver 220. Alternatively, the antenna(s) of the transmitter 210 used for transmitting the wireless-power signals are the same as the antenna(s) used for communicating the wireless data signals with the receiver 220.

Figure 3:
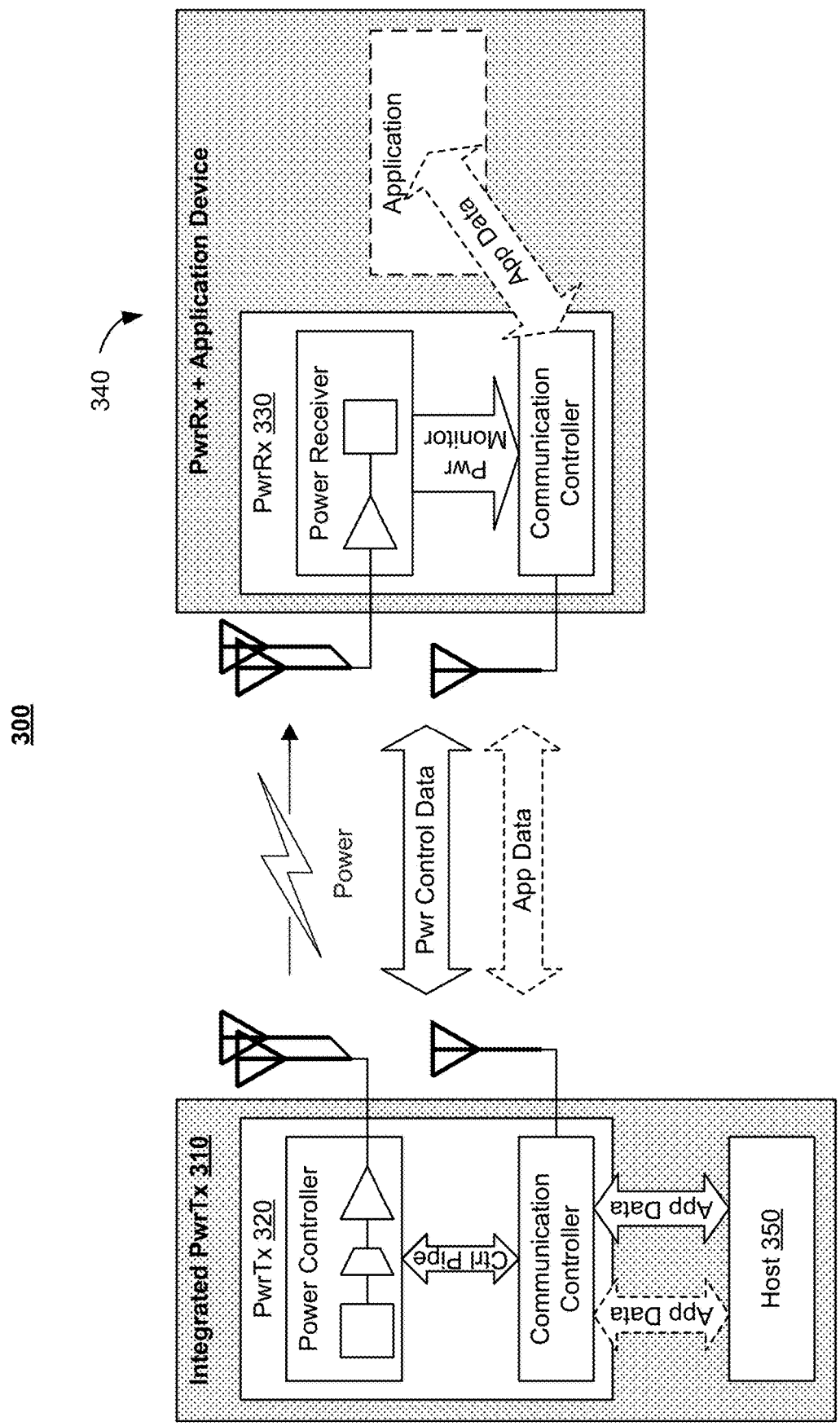
FIG. 3 is a block diagram of an example wireless power transmission system, in accordance with some embodiments.

FIG. 3 is a block diagram of an example wireless power transmission system 300, in accordance with some embodiments. In some embodiments, the wireless power transmission system 300 includes a wireless power transmitter 310 in communication with a power receiver 330. In some embodiments, the wireless power transmission system 300 is an integrated wireless power transmission system including an integrated wireless-power transmitter 310 (e.g., "Integrated PwrTx"), because the transmitter 310 is integrated into a host system 350 (e.g., a desktop computer) that supports multiple functions in addition to transmitting wireless-power signals. In some embodiments as illustrated in FIG. 1, the receiver 330 is associated with (e.g., integrated into) an electronic device 340 (also referred to as a data communication device or an application device) that exchanges application data with another electronic device over a data channel at a certain frequency band, such as Bluetooth, Zigbee, WiFi. In some embodiments, the application data includes, but is not limited to, audio data, video data, and/or text data, that are transmitted between two electronic devices (e.g., Bluetooth Low Energy (BLE) Human Interface Devices (HID)) via Bluetooth Advanced Audio Distribution Profile (A2DP) protocol. For example, the electronic device is a Bluetooth wireless headset that exchanges audio data with the host system 350, and the Bluetooth wireless headset also includes a wireless-power receiver that receives wireless-power signals from the wireless-power transmitter 310 to charge and/or power the Bluetooth headset.

In some embodiments, the wireless-power transmitter 310 includes a communication controller that establishes and maintains a control channel with the wireless-power receiver 330 for exchanging wireless power control data (e.g., "Pwr Control Data") with the receiver 330 to control and monitor the wireless-power transmissions. In some embodiments, the transmitter 310 shares the communication controller with the host system 350, and the communication controller further establishes a data channel to exchange application data (e.g., audio data, video data, text data, etc.) via the data channel between the host system 350 and the electronic device 340. In some embodiments, the application data is application specific between the host system 350 and the electronic device 340. For example, the application data is audio data between a computer and a Bluetooth headset. In some embodiments, the application data may be transmitted via the same frequency band as the wireless-power signals and the power control data, resulting in interference and reduced performance or denial of the wireless charging and/or wireless data services.

Figure 4:
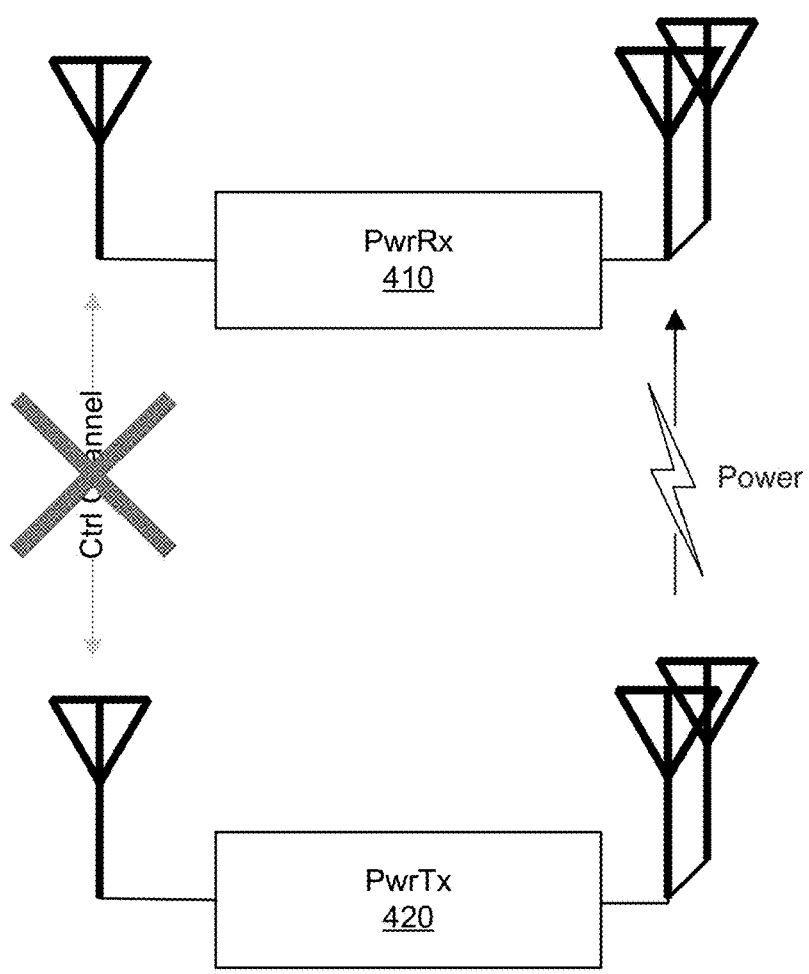
FIG. 4 is a schematic diagram of an example wireless power transmission system in a dead battery state of operation, in accordance with some embodiments.

FIG. 4 is a schematic diagram of an example wireless power transmission system 400 in a dead battery state of operation, in accordance with some embodiments. The wireless power transmission system 400 includes a wireless power receiver 410 and a wireless power transmitter 420 that are similar to the respective wireless power receiver and wireless power transmitter discussed with reference to FIGS. 1-3. In some embodiments, a battery of the wireless power receiver 410 or a battery of an electronic device integrated with the wireless power receiver 410 is depleted (e.g., unpowered, dead battery), thus there is no control channel or communication channel available between the receiver 410 and the transmitter 420.

In some embodiments, the transmitter 420 detects an electronic device including the receiver 410 nearby using an object detection procedure. For example, the electronic device including the receiver 410 is directly placed on the transmitter 420 or is placed within a predetermined distance from the transmitter 420. In some embodiments, the transmitter 420 detects that the receiver 410 is in proximity to the transmitter 420 using measurements of reflected power at the transmitter 420, and determines that the receiver 410 has been placed within a predetermined distance of (e.g., within 1-2 inches of a surface of) the transmitter 420. Upon detecting the receiver 410, the transmitter 420 transmits wireless-power signals (e.g., "Power") with default characteristics to the receiver 410. In some embodiments, the transmitter 420 transmits the wireless-power signals to the receiver 410 for a period of time that is sufficient to restart the communication channel between the receiver 410 and the transmitter 420. In some embodiments, the transmitter 420 transmits the wireless-power signals to the receiver 410 until the receiver 410 provides a wireless-power control signal (e.g., power control data, one or more characteristics of the wireless-power signals received at the receiver 410, and/or requests to adjust the characteristics of the wireless-power signals) to the transmitter 420.

In some embodiments, when the control channel or communication channel becomes available between the receiver 410 and the transmitter 420, the transmitter 420 transitions to an active state of operation as discussed with reference to FIG. 5. In the dead battery state of operation, the interference between transmitting the wireless-power signals and transmitting data signals (e.g., power control data, traffic profile data, and/or application data) may be avoided when the transmitter 420 is an integrated transmitter within a host system (as shown in FIG. 3).

Figure 5:
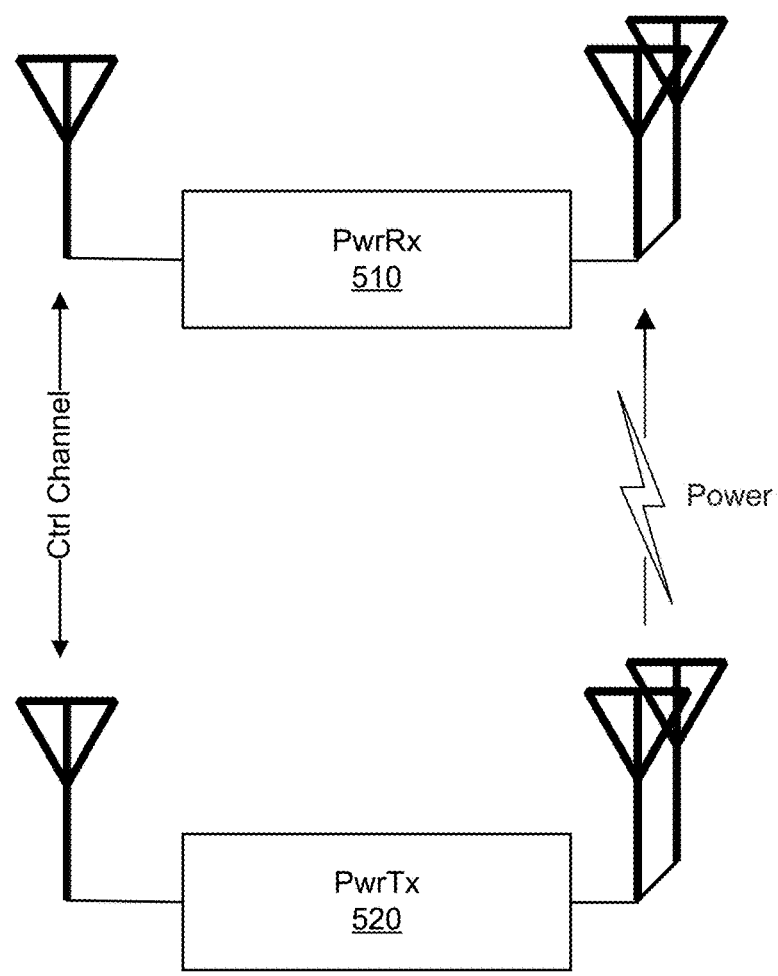
FIG. 5 is a schematic diagram of an example wireless power transmission system in an active state of operation without application data transmission, in accordance with some embodiments.

FIG. 5 is a schematic diagram of an example wireless power transmission system 500 in an active state of operation without application data transmission, in accordance with some embodiments. In this active state, the transmitter 510 is unaware of any application data communications within the system 500. There is no coexistence mitigation for application data channels. Instead, because a power control channel for transmitting power control data exists between the transmitter 520 and the receiver 510, the coexistence mitigation is mainly focused on the arbitration between transmission of the wireless-power signals and the power control data via the same frequency band in this state.

In some embodiments, the transmitter 520 detects the receiver 510 and establishes a connection to the receiver 510. Once the control channel is established between the transmitter 520 and the receiver 510, power control messages (e.g., power control data) are exchanged via the control channel to setup and optimize the wireless-power transmitted from the transmitter 520 to the receiver 510. After the power transmission has been established and optimized, the power control is enabled, and the transmitter 520 transmits wireless-power signals to the receiver 510. In some embodiments, the receiver 510 actively monitors the wireless-power signals received at the receiver 510 and communicates with the transmitter 520 through the control channel regarding the characteristics of the wireless-power signals received at the receiver 510.

In some embodiments, during a process of coexistence arbitration (e.g., to determine when to transmit power and/or data signals) between the transmission of wireless-power signals and power control data using the same frequency band, the transmission of wireless-power signals may be suspended when power control data is transmitted between the transmitter 520 and the receiver 510 using the power control channel. In some embodiments, this coexistence arbitration may happen when a small amount of power control data needs to be transmitted between the transmitter 520 and the receiver 520. For example, when the receiver 510 detects that the efficiency of wireless charging by the transmitter 520 is drastically reducing or has fallen below a predetermined threshold, the receiver 510 may send a power control message including commands to adjust the characteristics of the wireless-power signals to the transmitter 520. The system 500 may suspend the wireless-power signal transmission when the receiver 510 and the transmitter 520 further exchange power control data to adjust and optimize the wireless-power signals transmission. The transmission of wireless-power signals may be resumed once the optimization process is completed.

FIGS. 6-9 are schematic diagrams of example wireless power transmission systems in respective active states of operation including both wireless-power transmission and application data transmission, in accordance with some embodiments. In some embodiments, the transmitter is aware of the multiple channels of traffic (e.g., including transmissions of wireless-power signals, power control data, and application data). In some embodiments, the transmitter aggregates the information related to wireless-power transmission with the information related to application data transmission, and applies coexistence techniques to mitigate interference between the wireless-power transmission and application data transmission.

Figure 6:
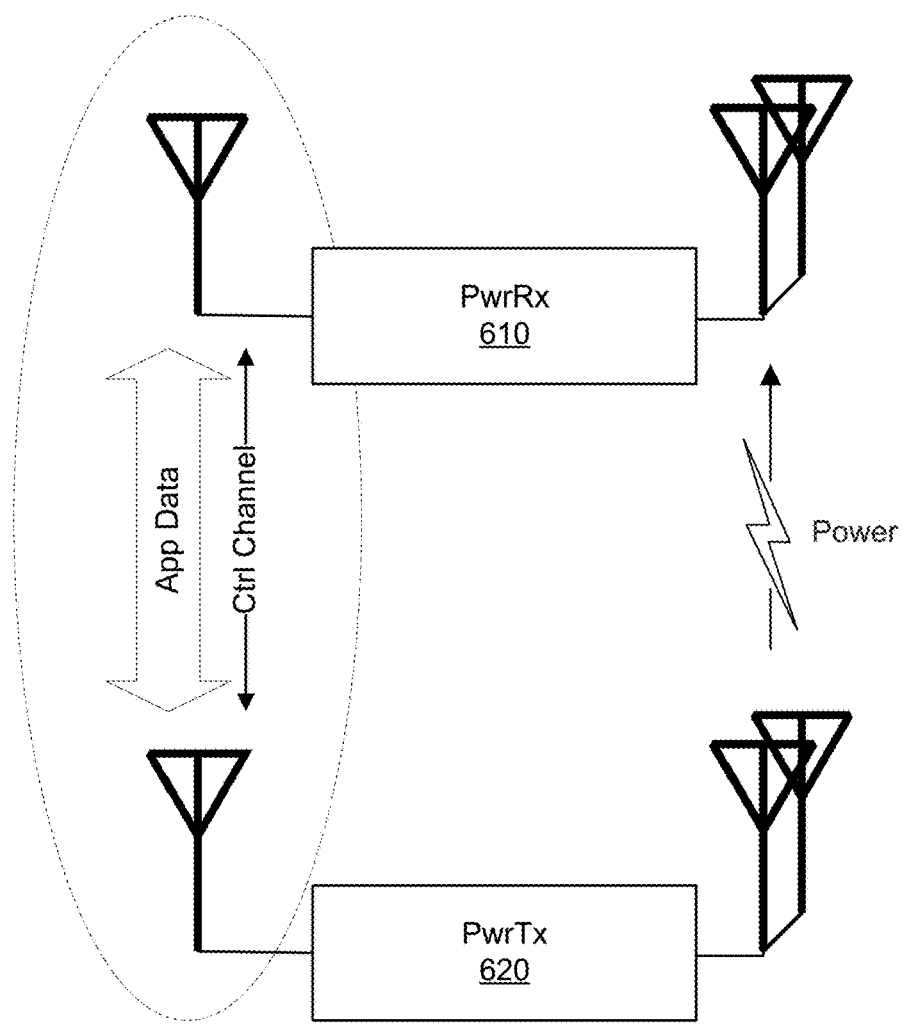
FIGS. 6-9 are schematic diagrams of example wireless power transmission systems in respective active states of operation including both wireless-power transmission and application data transmission, in accordance with some embodiments.

In some embodiments as shown in the wireless power transmission system 600 in FIG. 6 and in reference to FIG. 3, the transmitter 620 (e.g., "PwrTx") uses the same communication controller to transmit the power control data and the application data to the receiver 610 (e.g., "PwrRx") or an electronic device associated with the receiver 610. In some embodiments, the transmitter 620 obtains data traffic profile based on hardware (HW) signals from the communication controller of the transmitter 620 as well as traffic profile commands from the integrated transmitter 620 within the host system. In some embodiments, the data traffic is synchronous to the timer of the communication controller of the transmitter 620, and thus, techniques of synchronization are not required.

Figure 7:
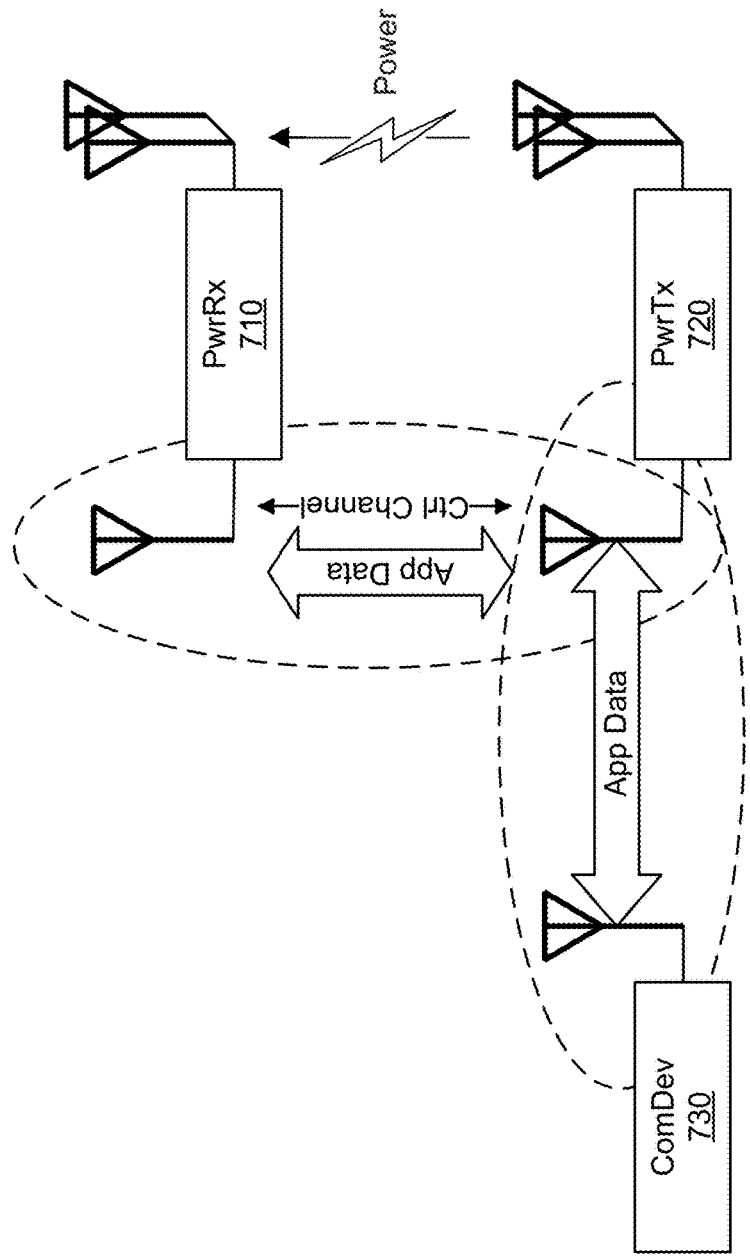

In some embodiments as shown in the wireless power transmission system 700 in FIG. 7 and further in reference to FIG. 3, application data traffic is routed between the electronic device 730 (e.g., "ComDev") and the integrated transmitter 720 (e.g., "PwrTx") via the communication controller of the transmitter 720. In some embodiments, the communication controller is also used to manage and transmit power control data. In some embodiments, the transmitter 720 obtains data traffic profile based on hardware (HW) signals from the communication controller of the transmitter 720 as well as traffic profile commands from the integrated transmitter 720 within the host system (e.g., the host system 350, FIG. 3). In some embodiments, the transmitter 720 further obtains traffic profile commands (e.g., for application data) from the host system (e.g., the host system 350, FIG. 3) associated with the integrated transmitter 720 to suit the application. In some embodiments, the data traffic timing between the electronic device 730 may not be synchronous to the timer of the communication controller of the transmitter 720, and thus, techniques of synchronization may need to be applied.

Figure 8:
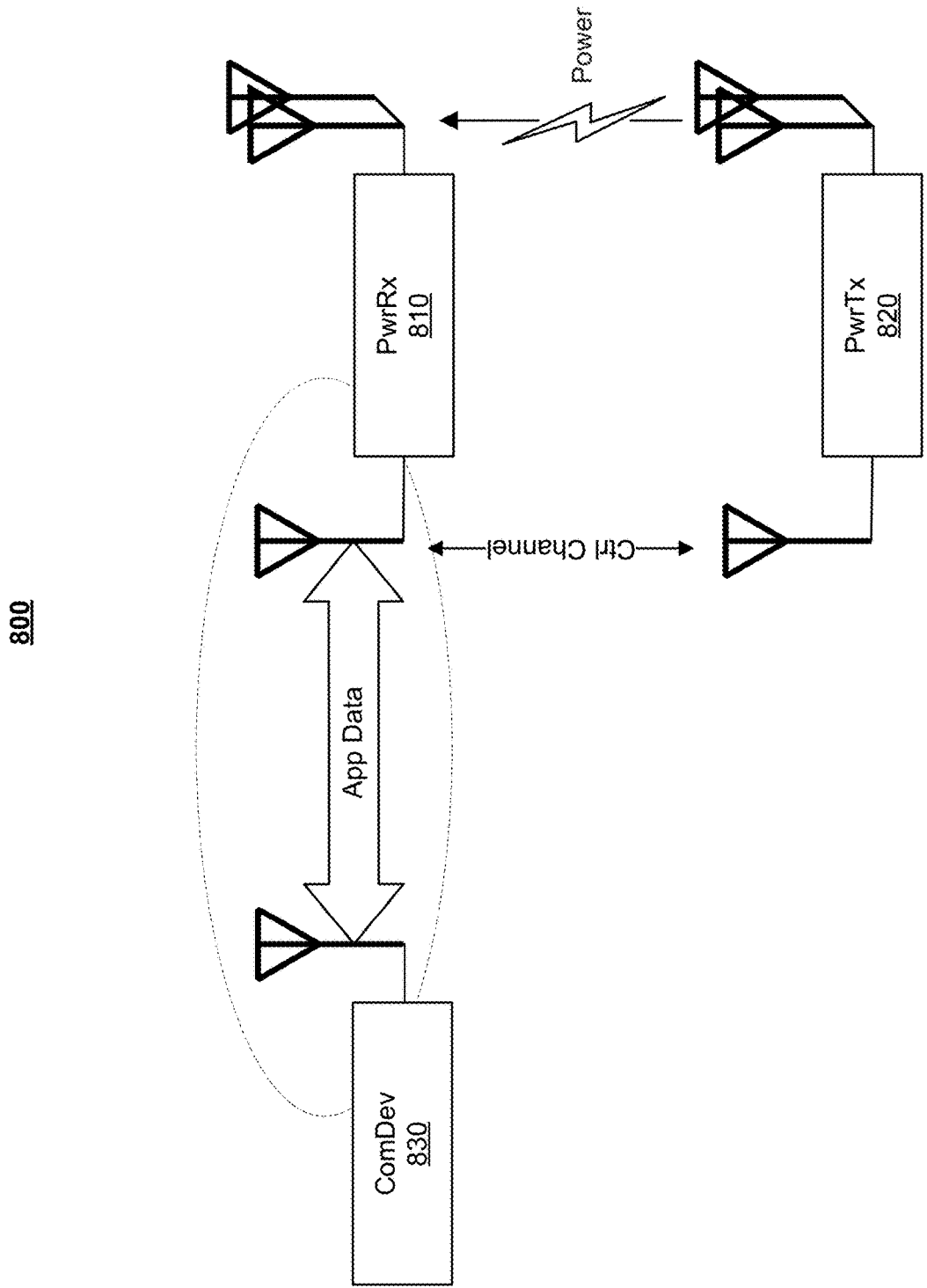

In some embodiments as shown in the wireless power transmission system 800 in FIG. 8 and further in reference to FIG. 3, the electronic device 830 (e.g., "ComDev") is associated with the wireless-power receiver 810 (e.g., "PwrRx"). For example, the electronic device 830 is a Bluetooth headset including a wireless-power receiver 810. In some embodiments, the application data traffic does not go through the communication controller of the wireless-power transmitter 820 (e.g., "PwrTx"), so the transmitter 820 does not receive traffic profile commands as discussed with reference to FIGS. 6-7. In some embodiments, the transmitter 820 obtains traffic profiles from the receiver 810, which can infer the traffic profile between the electronic device 830 and receiver 810 (e.g., coupled with the electronic device 830). In some embodiments, the receiver 810 sends the traffic profile commands to the transmitter 820 over the control channel (e.g., "Ctrl Channel"). In some embodiments, a software application on the receiver 810 may also send additional traffic profile commands to the transmitter 820 over the control channel. In some embodiments, the data traffic is not synchronous to the timer of the communication controller of the transmitter 820, and thus, techniques of synchronization may need to be applied.

Figure 9:
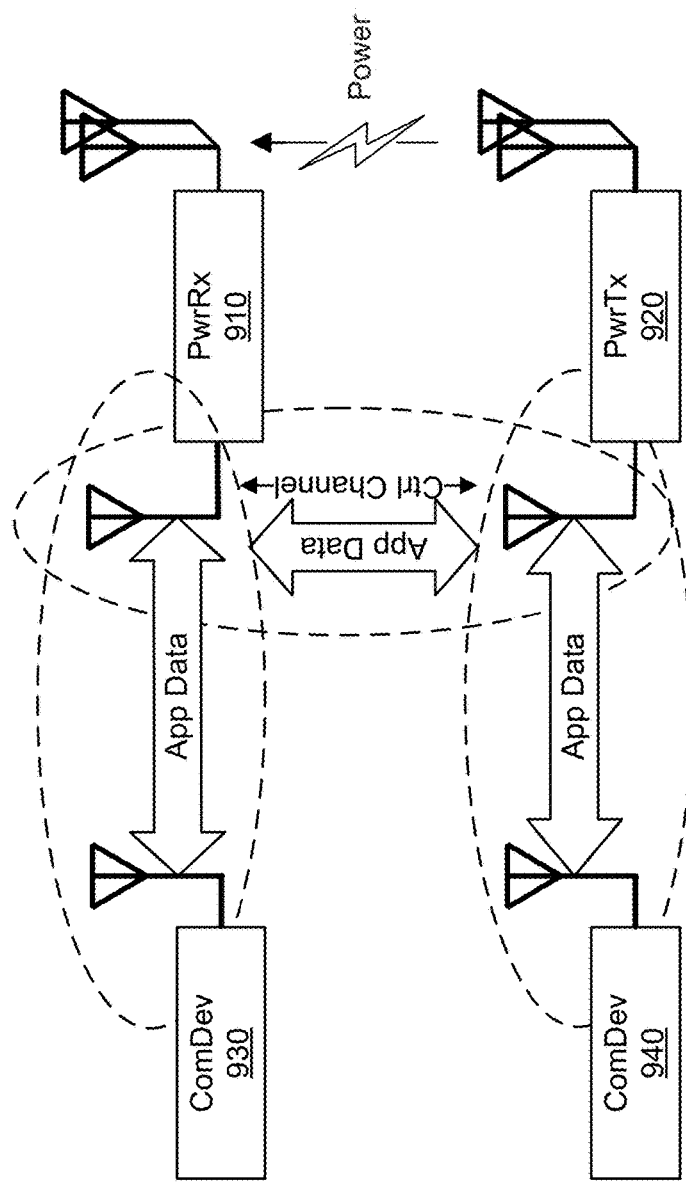

In some embodiments as shown in the wireless power transmission system 900 in FIG. 9 and further in reference to FIG. 3, the wireless-power transmitter 920 (e.g., "PwrTx") obtains the traffic profile information in similar processes as discussed with reference to FIGS. 6-8 above. In some embodiments, the wireless power transmission system 900 includes multiple electronic devices, such as electronic device 930 (e.g., "ComDev 930") coupled to the wireless-power receiver 910 (e.g., "PwrRx") and electronic device 940 (e.g., "ComDev 940") coupled to the transmitter 920 as shown in FIG. 9. In some embodiments, the electronic device 930 exchanges application data with the receiver 910, and the electronic device 940 exchanges application data with the transmitter 920. The application data of the electronic device 930 is distinct from the application data of the electronic device 940. In some embodiments, the transmitter 920 aggregates different streams of traffic profiles (e.g., including wireless-power signals and wireless data signals) within the wireless power transmission system 900, and applies arbitration mechanisms as discussed later in the present disclosure for coexistence of the various data traffic profiles. In some embodiments, due to the size of the load of various data streams on the shared medium using the same frequency band, the transmitter 920 may choose to lower its priority or power level to balance the load accordingly.

Figure 10B:
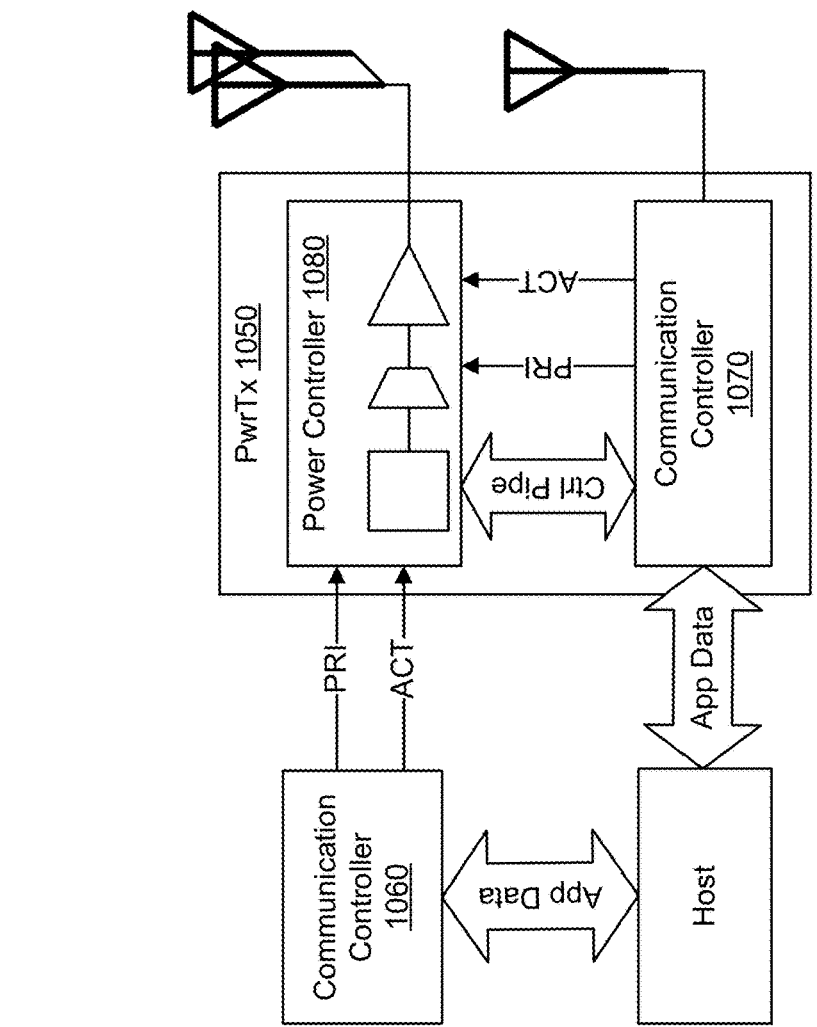
FIG. 10B is a schematic diagram of an example wireless power transmitter including multiple communication controllers, in accordance with some embodiments.
Figure 10A:
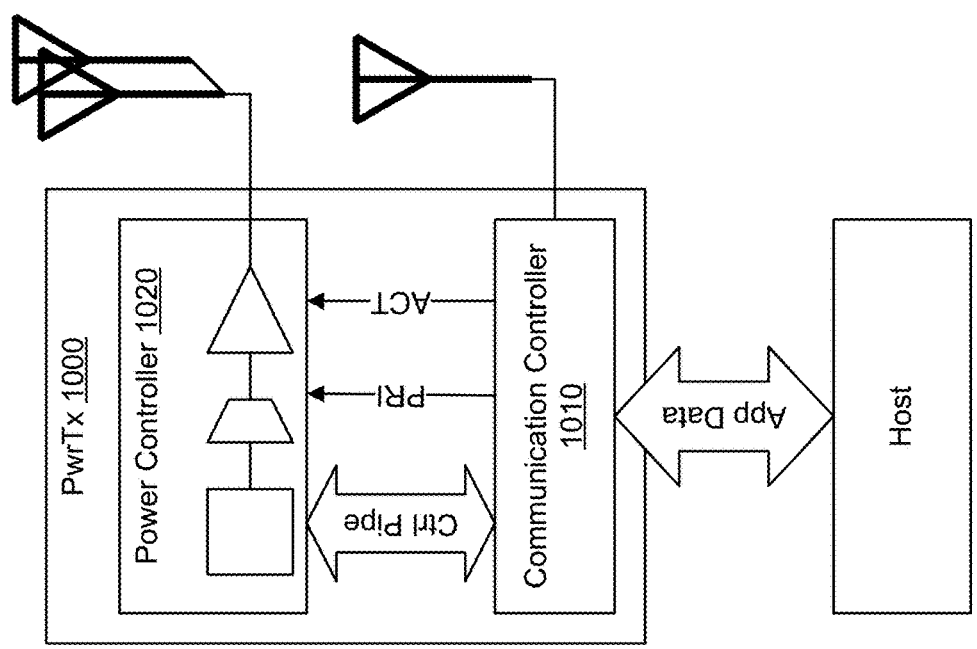
FIG. 10A is a schematic diagram of an example wireless-power transmitter including a single communication controller, in accordance with some embodiments.

FIG. 10A is a schematic diagram of an example wireless-power transmitter 1000 including a single communication controller 1010, in accordance with some embodiments. FIG. 10B is a schematic diagram of an example wireless power transmitter 1050 including multiple communication controllers (e.g., communication controllers 1060 and 1070), in accordance with some embodiments. In some embodiments, a traffic profile includes a set of parameters that define a deterministic timing pattern of a stream of application data traffic (e.g., traffic profile or data traffic profile) or power transmission (e.g., power profile). In some embodiments, to successfully mitigate interference between wireless-power signals transmission, power control data, and application data communications, the transmitter obtains the traffic profiles of concurrent data transmissions to determine the arbitration decisions. In some embodiments, the transmitter obtains the traffic profiles from the hardware (HW) packet timing arbitration (PTA) signals. In one example as shown in FIG. 10A, the communication controller 1010 of the transmitter 1000 provides the HW PTA signals as arbitration signals (e.g. IEEE 802.2) to the power controller 1020. In another example as shown in FIG. 10B, the communication controllers 1060 and 1070 provide arbitration signals (e.g. IEEE 802.2) to the power controller 1080. In some embodiments, the communication controllers further provide additional real-time traffic activity to the power controller through multiple coexistence control signals, such as power control data for controlling high-priority wireless-power signals "PRI" and power control data for controlling low-priority wireless-power signals "ACT", to be used to directly modulate the power transmission.

In some embodiments, a power profile protocol includes a set of commands and procedures for configuring the transmitter with a traffic profile for each stream of communication (e.g., application data stream, power control data stream, or wireless-power signals) as well as maintaining synchronization. In some embodiments, some traffic patterns are deterministic and periodic such that the corresponding traffic profiles can be sent to the power controller, and the power controller can accurately model the traffic patterns.

Figure 11:
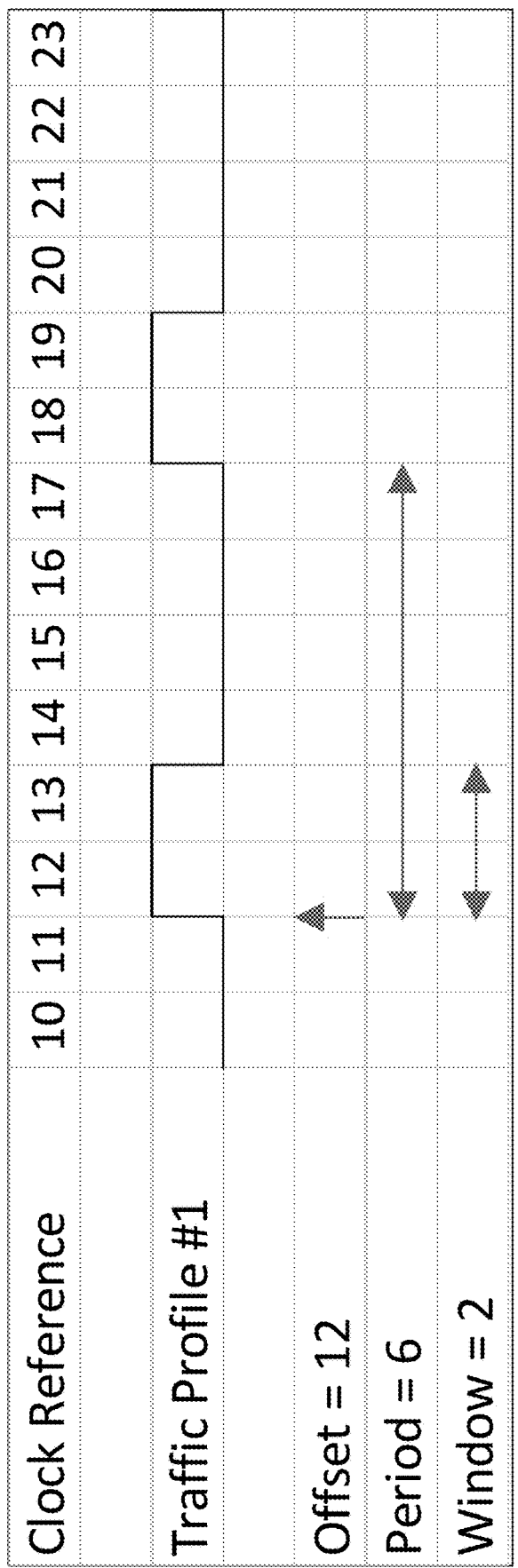
FIG. 11 is a schematic diagram of an example traffic profile, in accordance with some embodiments.

FIG. 11 is a schematic diagram of an example traffic profile, in accordance with some embodiments. In some embodiments, the traffic profile provides at least the following information:

Period—Period between frames of data traffic transmission;

Window—Size of the frame where data traffic is expected to be present;

Offset—Timing difference from the Power Controller clock timing or a specific point in time from the Power Controller's timing;

Priority—The relative priority of this stream of traffic relative to other streams;

Clock Source—Indicates which clock timing is used (e.g., Power Controller timing or external device whose timing can drift relative to Power Controller).

In some embodiments, the power profile information can be provided by the host system ("Host"), the communication controller(s), or the wireless-power receiver (not shown). In some embodiments, the power profile protocol may be obtained from different devices that are in direct communication or indirect communication with the transmitter. For example, the power profile protocol may be obtained from an electronic device coupled with the receiver, thus the commands may be sent from the electronic device and forwarded to the transmitter through the receiver.

In some embodiments, the traffic timing information is synchronized to a common clock and the traffic profiles are remapped to this clock. In some embodiments, the traffic timing synchronization is performed using synchronization procedure and/or clock drift compensation procedure.

Figure 12:
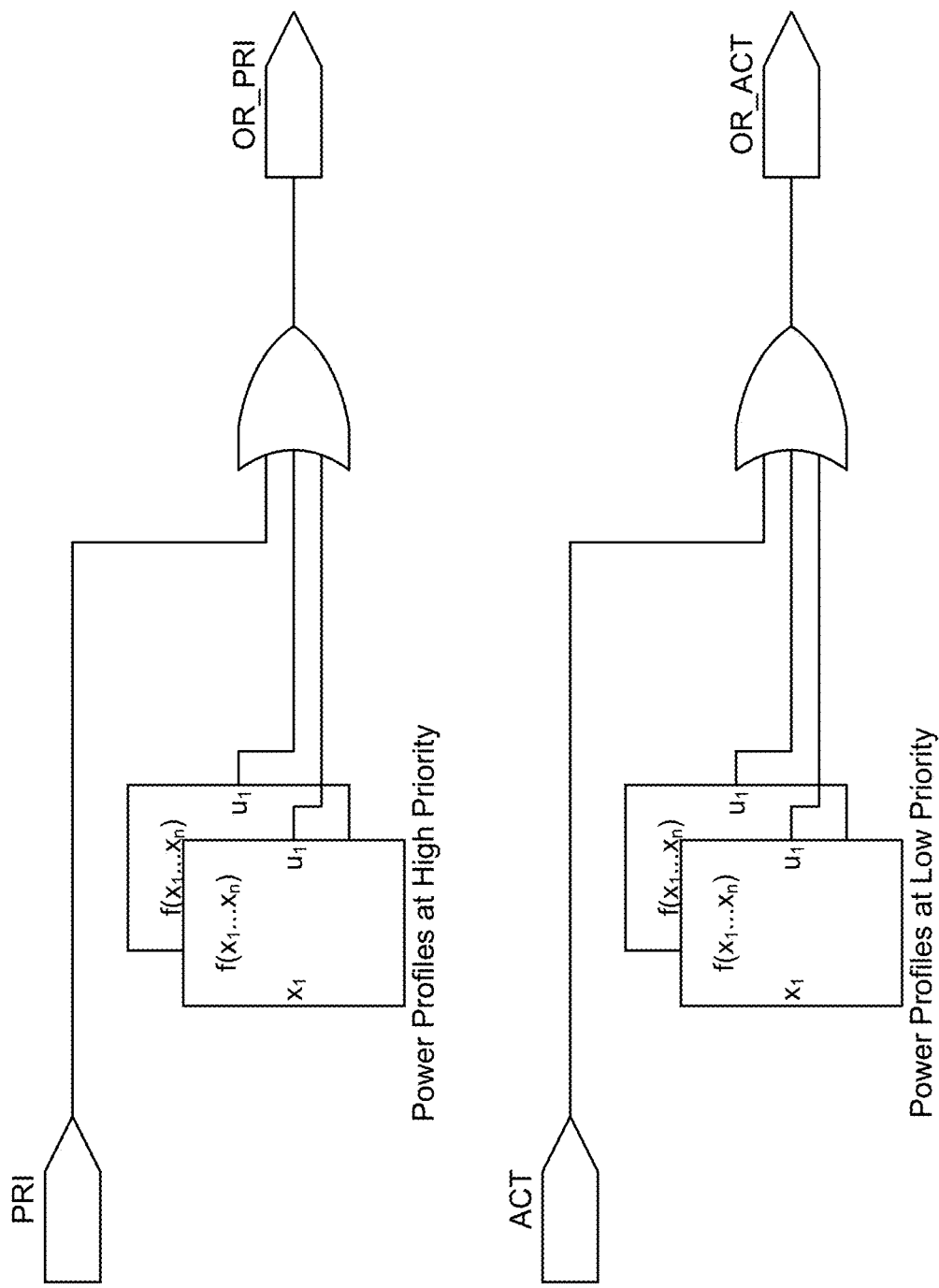
FIG. 12 is a schematic diagram of arbitration based on the traffic profile information and the hardware coexistence signals, in accordance with some embodiments.

FIG. 12 is a schematic diagram of arbitration based on the traffic profile information and the hardware (HW) coexistence signals, in accordance with some embodiments. In some embodiments, arbitration is where the wireless-power transmitter modulates its wireless-power transmissions to avoid conflicts with data traffic (e.g., power control data and/or application data). The transmitter utilizes the traffic profile information in combination with HW coexistence signals to maintain a quality of service (QoS) Policy.

In some embodiments, the traffic profile protocol provides enough information to locally generate the traffic pattern on the transmitter. In some embodiments, the HW coexistence signals are treated as the hardware equivalent of a traffic profile such that they can be grouped together with other traffic profiles and combined (i.e. logic OR) into a single group profile. For example, as shown in FIG. 12, wireless-power signals with high priority can be combined with HW coexistence signals (e.g., power control data for controlling high priority wireless-power signals "PRI") to generate a single group profile "OR_PRI." In another example, wireless-power signals with low priority can be combined with HW coexistence signals (e.g., power control data for controlling low priority wireless-power signals "ACT") to generate a signal group profile "OR_ACT."

Figure 13:
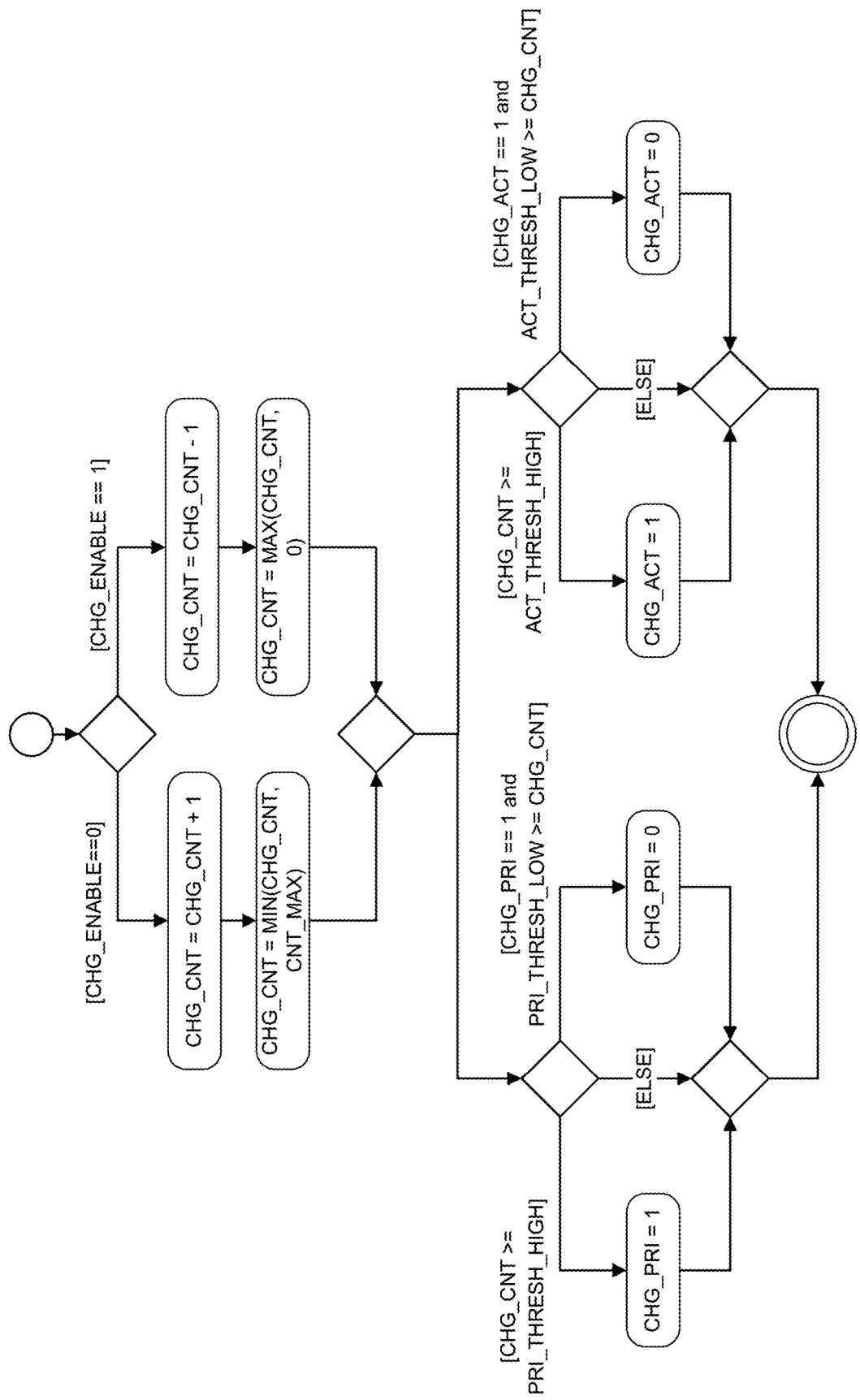
FIG. 13 is a schematic diagram illustrating an example charge rate profile algorithm, in accordance with some embodiments.

FIG. 13 is a schematic diagram illustrating an example charge rate profile algorithm, in accordance with some embodiments. In some embodiments, to ensure that the minimum charge rate is maintained, the transmitter can generate a set of Charge Rate Profiles based on the arbitration signal (e.g., "CHG_ENABLE"). In some embodiments, the example algorithm for generating the profile for minimum charge rate includes:

1) an internal counter (e.g., "CHG_CNT") will increment (e.g., CHG_CNT=CHG_CNT+1) up to a configurable max value (e.g., "CNT_MAX") when the transmitter is not transmitting power (e.g., "CHG_ENABLE==0"), and will decrement (e.g., CHG_CNT=CHG_CNT−1) to zero when the transmitter is transmitting power (e.g., "CHG_ENABLE==1");
2) the signals CHG_PRI (e.g., power control signals for controlling high-priority wireless-power signals) and the signals CHG_ACT (e.g., power control signals for controlling low-priority wireless-power signals) are then generated based on the CHG_CNT and its thresholds:
   a) if counter value (e.g., "CHG_CNT")>=high threshold for CHG_PRI (e.g., "PRI_THRESH_HIGH"), then charge CHG_PRI is asserted (e.g., "CHG_PRI=1") until counter value falls below low threshold for CHG_PRI (e.g., "CHG_PRI=1 and PRI_THRESH_LOW>=CHG_CNT"), then suspends CHG_PRI=0;
   b) if counter value (e.g., "CHG_CNT")>=high threshold for CHG_ACT (e.g., "ACT_THRESH_HIGH"), then charge CHG_ACT is asserted (e.g., "CHG_ACT=1") until counter value falls below low threshold for CHG_ACT (e.g., "CHG_ACT=1 and ACT_THRESH_LOW>=CHG_CNT"), then suspends CHG_ACT=0;
   c) the high threshold needs to be greater than the low threshold for hysteresis, e.g., PRI_THRESH_HIGH>PRI_THRESH_LOW, and ACT_THRESH_HIGH>ACT_THRESH_LOW.

Figure 14:
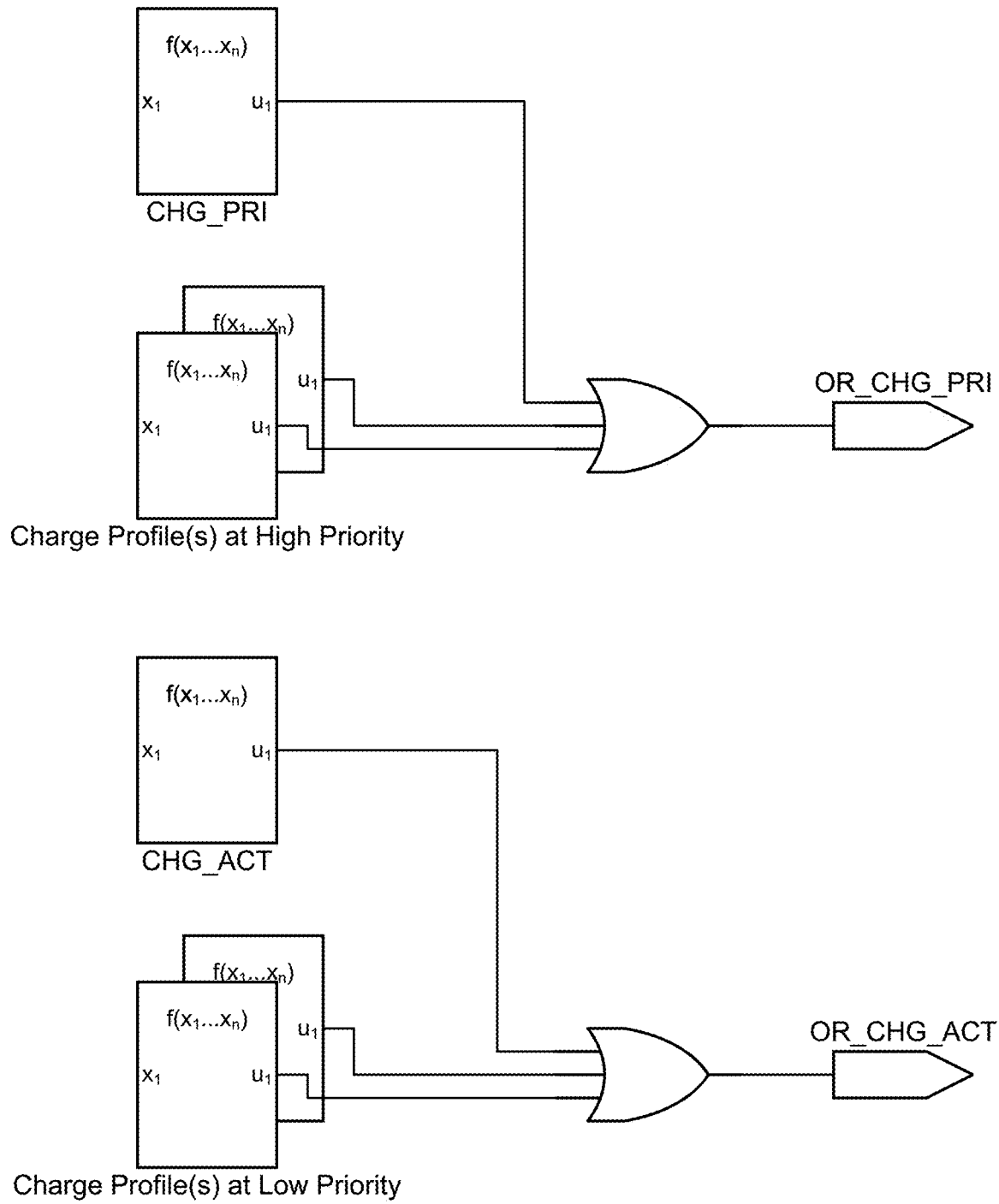
FIG. 14 is a schematic diagram illustrating example combined charge profiles, in accordance with some embodiments.

FIG. 14 is a schematic diagram illustrating example combined charge profiles, in accordance with some embodiments. In some embodiments, charge profiles (e.g., a charge profile for high-priority wireless-power signals "CHG_PRI," and/or a charge profile for low-priority wireless-power signals "CHG_ACT"), which are detected by the receiver, can also be included in transmission arbitration to ensure power transmission during the receiver power sampling for feedback. These charge profiles are like the power profiles used to resolve conflicts between wireless-power signals and data traffic, except that charge profiles are obtained after the wireless-power signals are transmitted and received at the receiver. These charge profile signals are then combined with Charge Rate Profile Algorithm. For example, the CHG_PRI (e.g., detected by the receiver) is combined with the charge profiles for high-priority wireless-power signals (e.g., "Charge Profile(s) at High Priority" (e.g. may be obtained from power controller of the transmitter) under "OR" logic to obtain the combined profile "OR_CHG_PRI." In another example, the CHG_ACT (e.g., detected by the receiver) is combined with the charge profiles for low-priority wireless-power signals (e.g., "Charge Profile(s) at Low Priority" (e.g. may be obtained from power controller of the transmitter) under "OR" logic to obtain the combined profile "OR_CHG_ACT."

Figure 15:
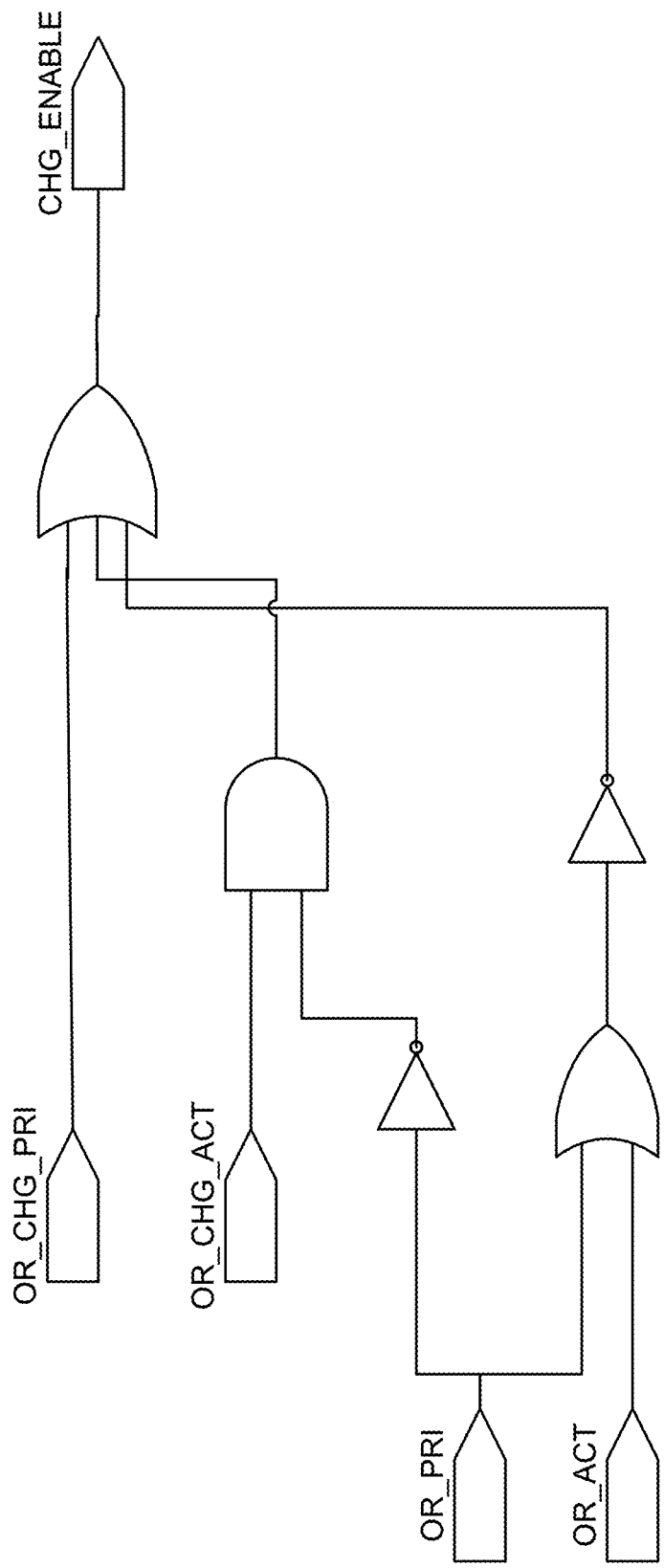
FIG. 15 is a schematic diagram illustrating an example priority arbitration algorithm, in accordance with some embodiments.
Figure 16:
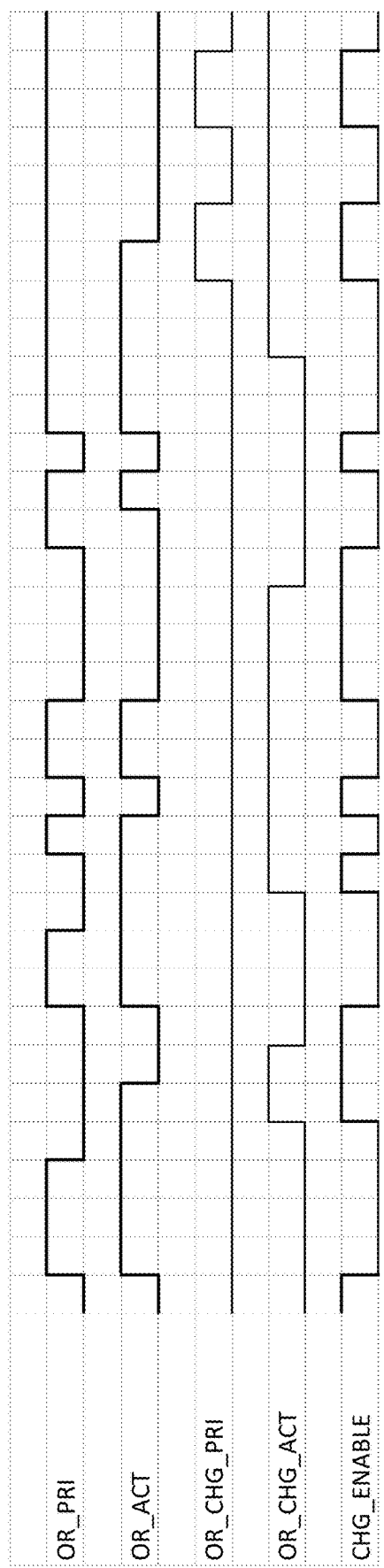
FIG. 16 shows priority arbitration waveforms as a result of applying the priority arbitration algorithm, in accordance with some embodiments.

FIG. 15 is a schematic diagram illustrating an example priority arbitration algorithm, in accordance with some embodiments. In some embodiments, all the signals (e.g., including OR_CHG_PRI, OR_CHG_ACT, OR_PRI, and OR_ACT) can then be computed to generate the priority arbitration signal CHG_ENABLE as shown in FIG. 15. In some embodiments, the CHG_ENABLE is asserted when (OR_PRI or OR_ACT)' or (OR_CHG_ACT and OR_PRI') or (OR_CHG_PRI). In some embodiments, wireless-power transmission takes the shared medium when CHG_EN-ABLE is asserted. Otherwise data communications takes the shared medium. FIG. 16 shows priority arbitration waveforms as a result of applying the priority arbitration algorithm, in accordance with some embodiments.

Figure 17:
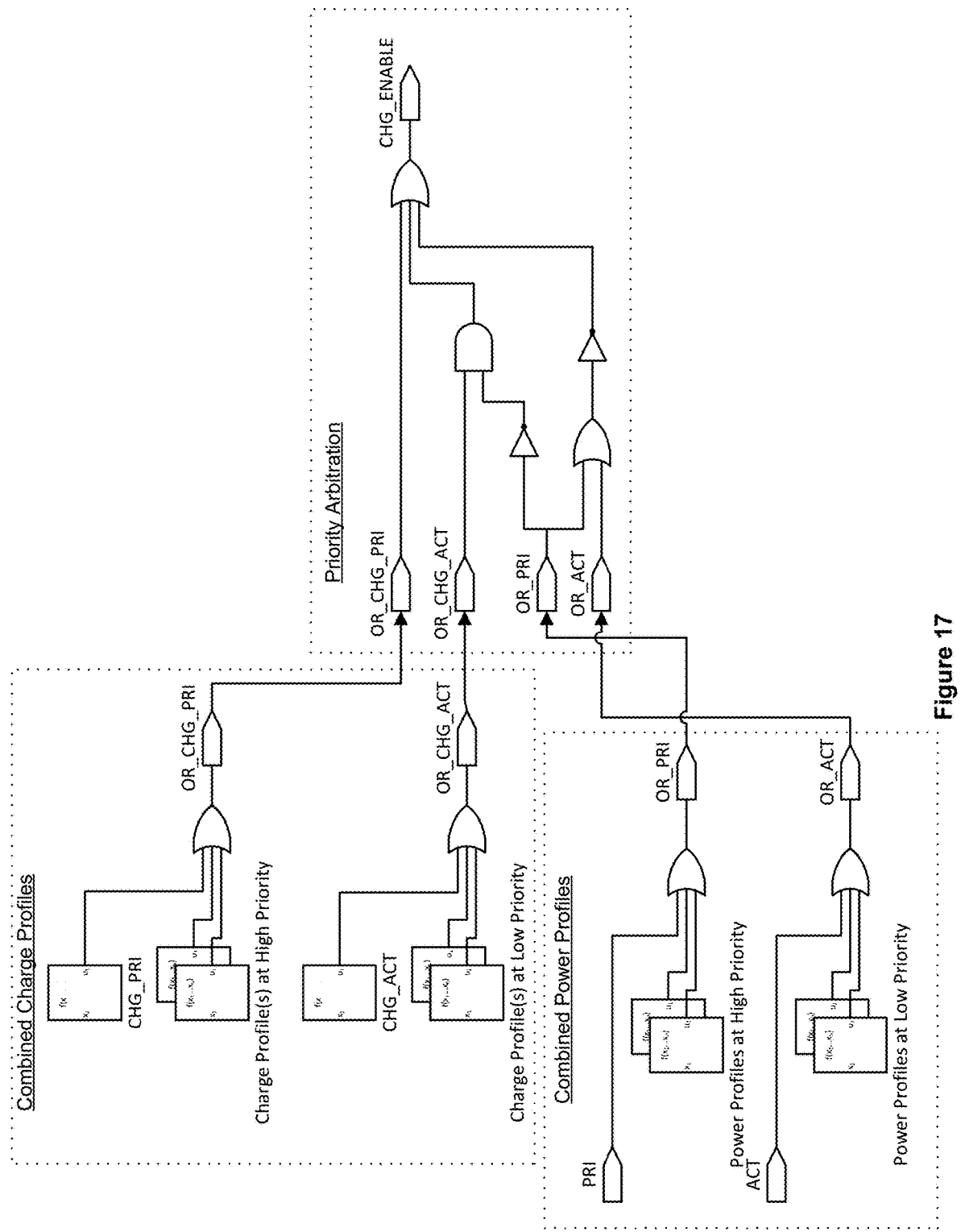
FIG. 17 is a schematic diagram illustrating an example arbitration system including arbitration subsystems as illustrated in FIGS. 12, 14, and 15, in accordance with some embodiments.

FIG. 17 is a schematic diagram illustrating an example arbitration system including arbitration subsystems as illustrated in FIGS. 12, 14, and 15, in accordance with some embodiments. In some embodiments, the arbitration system as illustrated in FIG. 17 includes a combined charge profile as discussed in FIG. 14, a combined power profile as discussed in FIG. 12, and a priority arbitration subsystem as discussed din FIG. 15. In some embodiments, the diagram in FIG. 17 shows the points where the hardware signals PRI and ACT are connected to, the internal signals generated from power and charge profiles and the final output CHG_ENABLE.

Figure 18:
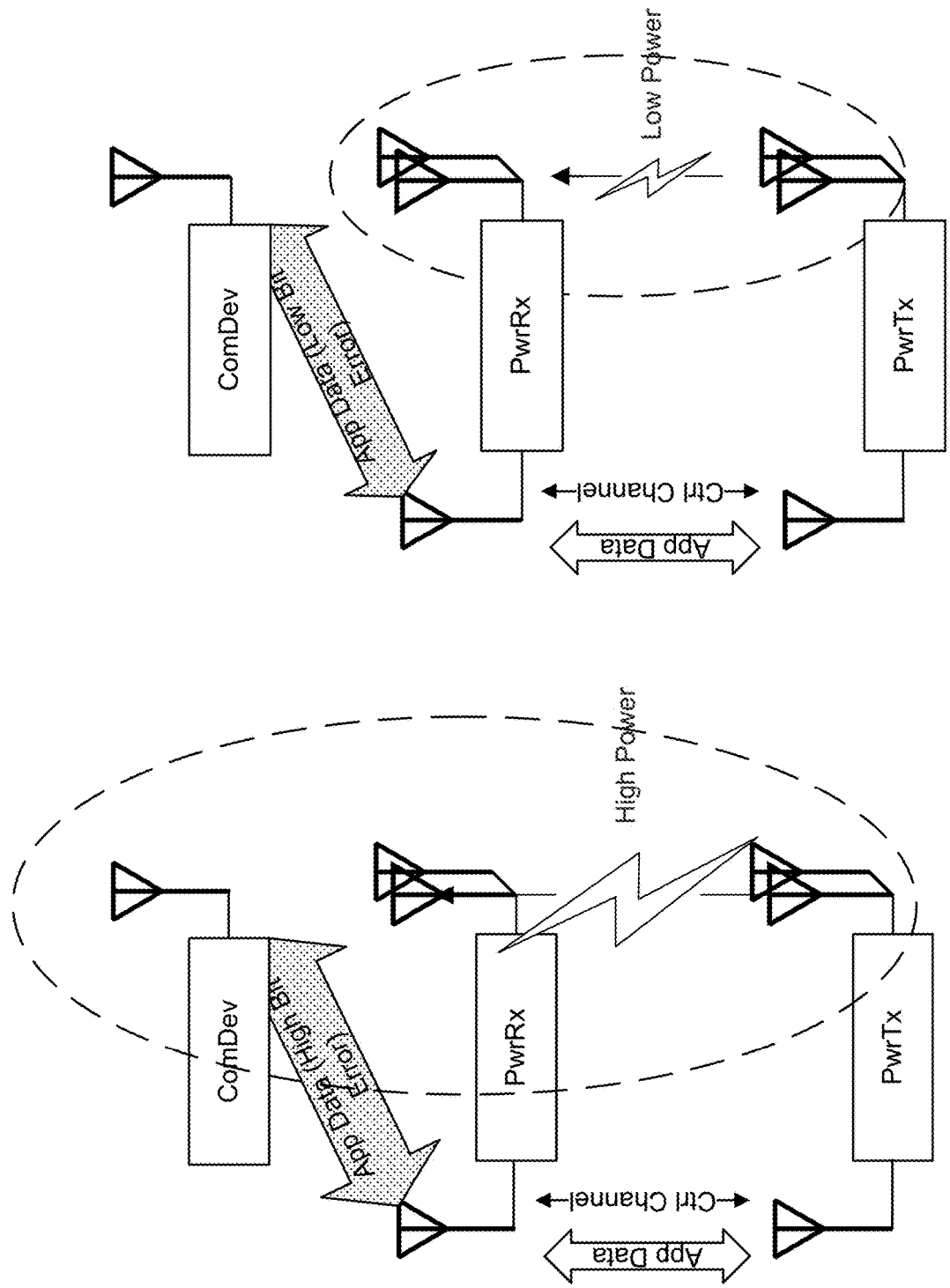
FIG. 18 is a schematic diagram of an example wireless power transmission system illustrating a high to low power level mitigation process, in accordance with some embodiments.

FIG. 18 is a schematic diagram of an example wireless power transmission system illustrating a high to low power level mitigation process, in accordance with some embodiments. In some embodiments, when wireless-power signals are transmitted from the transmitter to the receiver at a high power level as shown in the left portion of FIG. 18, such wireless-power transmission may interfere with data communication to a bigger area and at a greater extent as indicated by the bigger dashed ellipse. For example, the wireless-power transmission may interfere with the application data of the electronic device "ComDev" and result in a high bit error. In some embodiments, when wireless-power signals are transmitted from the transmitter to the receiver at a low power level as shown in the right portion of FIG. 18, such wireless-power transmission may interfere with data communication to a smaller area and at a less extent as indicated by the smaller dashed ellipse. For example, the wireless-power transmission may not interfere with the application data of the electronic device "ComDev" or may interfere with the application data of the electronic device less significantly and result in a low bit error.

In some embodiments, the wireless-power transmitter (e.g., "PwrTx") may reduce its peak power level during power transmission to reduce its area of interference (as indicated by the dashed ellipse shrinking from left to right in FIG. 18) on other electronic devices (e.g., "ComDev(s)") in proximity. In some embodiments, this may effectively lower the charging rate of the wireless-power receiver in exchange for mitigated interference between the wireless-power transmission and the application data communication (e.g. improving Bit Error Rate) on ComDev(s).

In some embodiments, the transmitter determines whether to reduce the wireless-power level, when to reduce the wireless-power level, and how much to reduce the wireless-power transmission level based on its assessment of the wireless-power transmission load (e.g., number of power profiles, activity of load) and statistics (e.g., bit error rate, packet error rate). In some embodiments, the transmitter may use a combination of power control and arbitration to optimize the balance between wireless-power transmission and data communication.

Figure 19A:
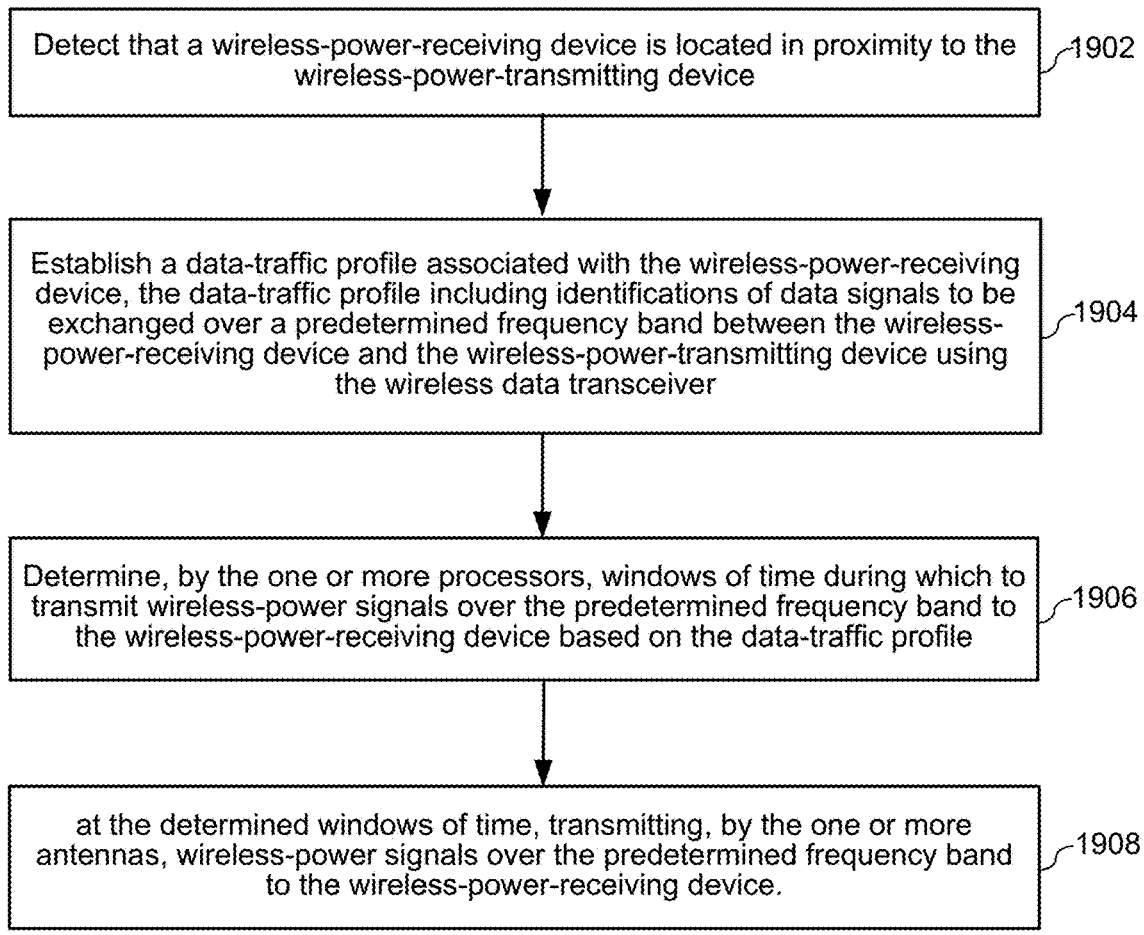
FIGS. 19A-19B are flow diagrams showing respective methods of wireless power transmission, in accordance with some embodiments.

FIG. 19A is a flow diagram showing a method 1900 of wireless power transmission, in accordance with some embodiments. Operations (e.g., steps) of the method 1900 may be performed by a wireless-power-transmitting device (e.g., transmitter 102, FIG. 1; also referred to as "wireless-power transmitter", "transmitter") having one or more antennas (e.g., antenna array(s) 110, FIG. 1) configured to transmit wireless-power signals, one or more processors (processor(s) 104, FIG. 1) and a wireless data transceiver (e.g., communications component(s) 112, FIG. 1). In some embodiments, at least some of the operations shown in FIG.

19A correspond to instructions stored in a computer memory or computer-readable storage medium (e.g., memory 104 of the transmitter 102, FIG. 1).

In some embodiments, the wireless-power-transmitting device includes a controller (with the one or more processors) and the wireless data transceiver in a same housing as the one or more antennas. In some embodiments, the controller and wireless data communications component may be in a housing that is separate from a housing that includes the one or more antennas. In some embodiments, instead of including the controller and wireless data transceiver in a same housing as other components of the wireless-power-transmitting device, the controller and/or wireless data transceiver can be included in a separate host device that is in communication with and is configured to control operation of the wireless-power-transmitting device.

The wireless-power transmitter detects (1902) that a wireless-power-receiving device (e.g., receiver 120, FIG. 1; also referred to as "wireless-power receiver", "receiver") is located in proximity to the wireless-power-transmitting device. In some embodiments, the wireless-power-transmitting device is a charging pad, and the wireless-power-transmitting device detects that the wireless-power receiver (e.g., a Bluetooth headset, or a mobile phone) is placed on the charging pad.

After detecting that the wireless-power-receiving device is located in proximity to the wireless-power-transmitting device, the wireless-power-transmitting device establishes (1904) a data-traffic profile associated with the wireless-power-receiving device. In some embodiments, the data-traffic profile includes identifications of data signals to be (or actively being) exchanged over a predetermined frequency band between the wireless-power-receiving device and the wireless-power-transmitting device using the wireless data transceiver. In some embodiments, a data-traffic profile is a data structure that is used to represent data signals that are to be exchanged between different devices. In some embodiments, more than one data-traffic profile is generated.

The wireless-power-transmitting device further determines (1906), by the one or more processors, windows of time during which to transmit wireless-power signals over the predetermined frequency band to the wireless-power-receiving device based on the data-traffic profile. In some embodiments, the wireless-power transmitter builds a combined profile that identifies when to transmit the power signals as discussed with reference to FIGS. 12, 14-15, and 17.

At the determined windows of time, the wireless-power transmitter transmits (1908), by the one or more antennas, wireless-power signals over the predetermined frequency band to the wireless-power-receiving device.

In some embodiments, the identifications of data signals to be exchanged include information identifying a respective data type (e.g., audio data, video data, text data, etc.) for each respective data signal, and a point in time at which each respective data signal is to be exchanged.

In some embodiments, establishing the data-traffic profile comprises categorizing, by the wireless-power transmitter, the data signals based on each of the respective data types for each of the data signals. In some embodiments, the wireless-power transmitter then determines respective priority levels for each of the data signals. For example, when a video application is running on the electronic device coupled with the wireless-power receiver, the video data is given the higher priority, with text data having lower priority. In another example, when data reception is restricted, text data may be given a higher priority, while video data and audio data are given a lower priority. The data types and established priority levels associated with respective data types are used to establish the data-traffic profile.

In some embodiments, the windows of time during which to transmit wireless-power signals to the first wireless-power-receiving device are windows of time during which no data signals with a high priority level are to be exchanged.

In some embodiments, while transmitting wireless-power signals during a respective window of time and in accordance with a determination that data signals with a high priority level are to be exchanged during the respective window of time, the wireless-power transmitter suspends transmission of wireless-power signals to the wireless-power-receiving device.

In some embodiments, in accordance with a determination that a charge level (current battery level or current charging rate) of the wireless-power-receiving device is less than a charge-level threshold, the wireless-power transmitter resumes the transmission of wireless-power signals to the wireless-power-receiving device. In some examples, if priority data is lost (e.g., bit error is high), the wireless-power transmitter resends the priority data when transmission of wireless-power charging idles. In some embodiments, the wireless-power transmitter chooses to interrupt data transmissions (even for high priority data) because the charge level of the wireless-power receiver is too low (e.g., lower than a predetermined threshold). In some embodiments, the wireless-power transmitter then monitors whether the transmission of data has been negatively impacted, such as data signals either not transmitted or transmitted only incompletely (i.e., with too much loss of information). In some embodiments, in accordance with a determination that a set of data signals associated with a high priority level was lost while transmitting the plurality of wireless-power signals to the wireless-power-receiving device, the wireless-power transmitter schedules the transmission of the set of data signals to the wireless-power-receiving device during the next power transmission idle period.

In some embodiments, in conjunction with resuming the transmission of wireless-power signals, the wireless-power transmitter provides a notification to a user of the wireless-power-receiving device that receipt of data signals may be interrupted. For example, the user is notified that resuming the wireless charging will interrupt their data traffic, e.g., audio data or video data they are interacting with. In some embodiments, in accordance with a determination that data signals with high priority are pending for transmission and resuming the wireless charging will suspend the priority data traffic, the wireless-power transmitter further provides a notification to notify the user of the suspension of the transmission of the data signals. In some embodiments, the user may choose to select a time to resume data transmission later, e.g., in 10 minutes. In some embodiments, the system may enforce alternating charging and data transmission to maintain a minimum charging rate while maintaining the data transmission.

In some embodiments, when the wireless-power transmitter determines that a wireless-power receiver has been charged for too long (e.g., longer than a predetermined time period), and there is data waiting in line to be transmitted, the wireless-power transmitter chooses to suspend the wireless charging and transmit data in the waiting queue. For example, when the wireless-power transmitter determines that a wireless-power receiver has been charged for too long, the transmitter queries the battery state. When the battery state is higher than a threshold, e.g., 50% (or some greater or lesser percentage) of the full battery state, the wireless charging is paused to exchange data. In some embodiments, data with higher priority is transmitted first, and data with lower priority is transmitted after the high-priority data transmission is completed.

In some embodiments, resuming the transmission of wireless-power signals includes transmitting wireless-power signals while a data signal is being exchanged between the wireless-power-receiving device and another device. In some embodiments, the wireless-power transmitter adjusts at least one transmission characteristic for the wireless-power signals to minimize interference with the data signal. In some embodiments, the adjusting is performed by the wireless-power transmitter in accordance with a determination that exchange of the data signal has an error rate above a threshold error rate (e.g., bit error rate is too high, indicating data not being reliably exchanged anymore). In some embodiments, the adjusting is performed by the wireless-power transmitter until the error rate falls below the threshold error rate.

In some embodiments, the wireless-power transmitter adjusts at least one transmission characteristic (e.g., adjusts a value of the at least one transmission characteristic) for the wireless-power signals based on respective priority levels of the data signals exchanged between the wireless-power transmitting device and the wireless-power-receiving device. In some embodiments, the at least one transmission characteristic is a power level, such as an amplitude used for transmission of the wireless-power signals. For example, a high level of power is selected when transmitting low-priority data, and a low level of power is selected when transmitting high-priority data.

In some embodiments, detecting that the wireless-power-receiving device is in proximity to the wireless-power-transmitting device includes detecting, using measurements of reflected power at the wireless-power transmitting device, that the wireless-power-receiving device has been placed within a predetermined distance of (e.g., within 1-2 inches of a surface of) the wireless-power-transmitting device. In some embodiments, when the wireless-power-receiving device is out of power, the wireless-power transmitter may detect a dead-battery device being placed on the wireless-power-transmitting device using way(s) disclosed in U.S. application Ser. No. 15/943,559, entitled "Methods of Selectively Activating Antenna Zones of a Near-Field Charging Pad to Maximize Wireless Power Delivered to a Receiver" filed on Apr. 2, 2018, which is incorporated herein by reference in its entirety.

In some embodiments, in response to detecting that the wireless-power-receiving device has been placed within the predetermined distance of the wireless-power-transmitting device and before establishing the data-traffic profile, the wireless-power transmitter transmits, via the one or more antennas, wireless-power signals with default characteristics to the wireless-power-receiving device until the wireless-power-receiving device provides a wireless-power-control signal to the wireless-power-transmitting device. In some embodiments, the power of the wireless-power-receiving device is at least partially restored to have sufficient power for starting communication with the wireless-power-transmitting device.

In some embodiments, the wireless-power-transmitting device uses the wireless-power-control signal to determine specific values to use for transmission characteristics (e.g., values used for certain waveform characteristics, such as values for amplitude, frequency, phase, etc.), distinct from default values used for those characteristics, and those specific values for the transmission characteristics are then used for transmitting wireless-power signals to the wireless-power-receiving device. In some embodiments, the wireless-power-transmitting device also optimizes transmission of wireless power signals by manipulating the specific values. In some embodiments, the established data-communications traffic profile includes a traffic profile of the wireless power control signals exchanged between the wireless-power-transmitting device and the wireless-power-receiving device.

In some embodiments, the identifications of data signals included in the data-traffic profile include identifications of wireless-power-control signals to be exchanged between the wireless-power-receiving device and the wireless-power-transmitting device. In some embodiments, the wireless-power-transmitting device uses the wireless-power-control signal to determine specific characteristics to use for transmitting wireless-power signals to the wireless-power-receiving device.

In some embodiments, the identifications of data signals included in the data-traffic profile further include identifications of application-specific data signals to be exchanged between the wireless-power-receiving device and the wireless-power-transmitting device. In some embodiments, the application-specific data signals are associated with a software application executing on the wireless-power-receiving device.

In some embodiments, establishing one or more data-communications traffic profiles associated with the wireless-power-receiving device comprises: detecting application data exchanged via the wireless communications component between the wireless-power-transmitting device and the wireless-power-receiving device to establish a first data-communications traffic profile; detecting wireless power control messages exchanged via the wireless communications component between the wireless-power-transmitting device and the first wireless-power-receiving device to establish a second data-communications traffic profile, the wireless power control messages including one or more parameters associated with the plurality of first wireless-power signals; assigning priority levels to the application data and the wireless power control messages respectively. In some embodiments, determining the first wireless power transmission profile comprises: prioritizing transmission of the plurality of first wireless-power signals based on the priority levels of the first data-communications traffic profile and the second data-communications traffic profile. In some embodiments, the timings of transmitting the application data and the wireless power control messages are synchronized, for example, using the same the internal clock associated with the transmitter communications component (e.g., controller). In some embodiments, the wireless-power transmitter further aggregates, categorizes (if multiple types of application data exist), and determines priorities of the first data-communications traffic profile and the second data-communications traffic profile.

In some embodiments, the data-traffic profile also includes identifications of additional data signals to be exchanged between the wireless-power-transmitting device and an additional device other than the wireless-power-receiving device. In some embodiments, the additional device is communicatively coupled to the wireless-power-transmitting device. In some embodiments, the additional device is another power receiver in addition to the first wireless-power-receiving device. In some embodiments, the data-communications traffic profile includes traffic profiles for application data and power control data, and such traffic profiles might be for devices that are going to receive wireless power from the pad, as well as other devices that will not receive power from the pad (e.g., a pair of headphones receiving audio data from a phone that is to receive wireless power).

In some embodiments, the timings of transmitting the application data and the wireless power control messages are not synchronized. In these circumstances, respective internal clocks of transmitter and computing device(s) are used for timing synchronization. In some embodiments, when there is more than one data-communications traffic profile, prior to determining the first wireless power transmission profile, the wireless-power transmitter synchronizes timings of the more than one data-communications traffic profile.

In some embodiments, the additional device is a second wireless-power-receiving device, the additional data signals include wireless-power-control signals to be exchanged between the second wireless-power-receiving device and the wireless-power-transmitting device, and the wireless-power-transmitting device uses the wireless-power-control signals to determine specific characteristics to use for transmitting wireless-power signals to the second wireless-power-receiving device.

In some embodiments, the additional data signals include application-specific data signals to be exchanged between the second wireless-power-receiving device and the wireless-power-transmitting device. In some embodiments, the application-specific data signals are associated with a software application that is executing on the second wireless-power-receiving device. In some embodiments, additional adjustments may also be made to signal transmissions and to prioritize when to transmit power and data to two or more different receiving devices. For example, transmission of the first wireless power signals and the transmission of the second wireless power signals may be prioritized in accordance with one or more of: (1) respective battery states of the first wireless-power-receiving device and the third device, (2) respective device types of the first wireless-power-receiving device and the third device (e.g., work/study related device prioritized over gaming device), and (3) priority levels of application data exchanged respectively (i) between the wireless-power-transmitting device and the first wireless-power-receiving device, and (ii) between the wireless-power-transmitting device and the third device. For example, video streaming may be prioritized over document data when using a video streaming device, or vice versa when data reception is restricted.

In some embodiments, the data-traffic profile also includes identifications of application-specific data signals to be exchanged between the wireless-power-receiving device and a second device other than the wireless-power-transmitting device. In some embodiments, the second device is communicatively coupled to the wireless-power-receiving device, and the application-specific data signals are associated with a software application executing on the wireless-power-receiving device. In some embodiments, the second device is a peripheral device of the receiver, such as a pair of headphones receiving audio data from a phone that is wireless charged by a wireless-power transmitter. In some embodiments, the second device (the peripheral device) does not receive wireless power signals from the wireless-power-transmitting device.

In some embodiments, the wireless-power transmitter can setup different data-traffic profiles for each different power-receiving device to allow for determining when to transmit power to each of the receiving devices. In some embodiments, the wireless-power-transmitting device is (a) coupled to the third device and (b) configured to transmit a plurality of wireless-power signals to the third device. In some embodiments, establishing the one or more data-communications traffic profiles further comprises: establishing a first data-communications traffic profile associated with a plurality of first wireless power control messages exchanged between the wireless-power-transmitting device and the first wireless-power-receiving device and associated with transmission of the plurality of first wireless-power signals; and establishing a second data-communications traffic profile associated with a plurality of second wireless power control messages exchanged between the third device and the wireless-power-transmitting device and associated with transmission of the plurality of second wireless-power signals.

In some embodiments, the one or more data-communications traffic profiles are further associated with one or more types of application data exchanged between the wireless-power-transmitting device and the first wireless-power-receiving device. In some embodiments, there are multiple power profiles for charging multiple power receivers.

In some embodiments, the wireless-power transmitter further determines a second wireless power transmission profile associated with transmitting the plurality of second wireless-power signals based on the one or more data-communications traffic profiles and the first wireless power transmission profile. In some embodiments, the wireless-power transmitter then transmits, by the plurality of antennas, the plurality of first wireless power signals to the first wireless-power-receiving device in accordance with the first wireless power transmission profile, and also transmits the plurality of second wireless power signals to the third device in accordance with the second wireless power transmission profile.

In some embodiments, the wireless-power transmitter prioritizes the transmission of the first wireless power signals and the transmission of the second wireless power signals in accordance with one or more of: (1) respective battery states of the first wireless-power-receiving device and the third device, (2) respective device types of the first wireless-power-receiving device and the third device, and (e.g., work/study related device prioritized over gaming device), and (3) priority levels of application data exchanged respectively (i) between the wireless-power-transmitting device and the first wireless-power-receiving device, and (ii) between the wireless-power-transmitting device and the third device (e.g., video streaming prioritized over document data).

In some embodiments, the data signals are to be exchanged using a same frequency band as the plurality of power transmission signals. In some embodiments, the wireless-power-receiving device comprises circuitry for receiving and converting wireless-power signals into usable power, and an electronic device that is coupled to the circuitry. In some embodiments, the circuitry provides the usable power to the electronic device to provide operating power or charge a battery thereof. In some embodiments, establishing the data-traffic profile includes receiving, via the one or more processors, information regarding at least some of the data signals from a controller associated with the wireless data transceiver. In some embodiments, an identification of a respective data signal of the data signals included in the data-traffic profile includes transmission characteristics for the respective data signal.

Figure 19B:
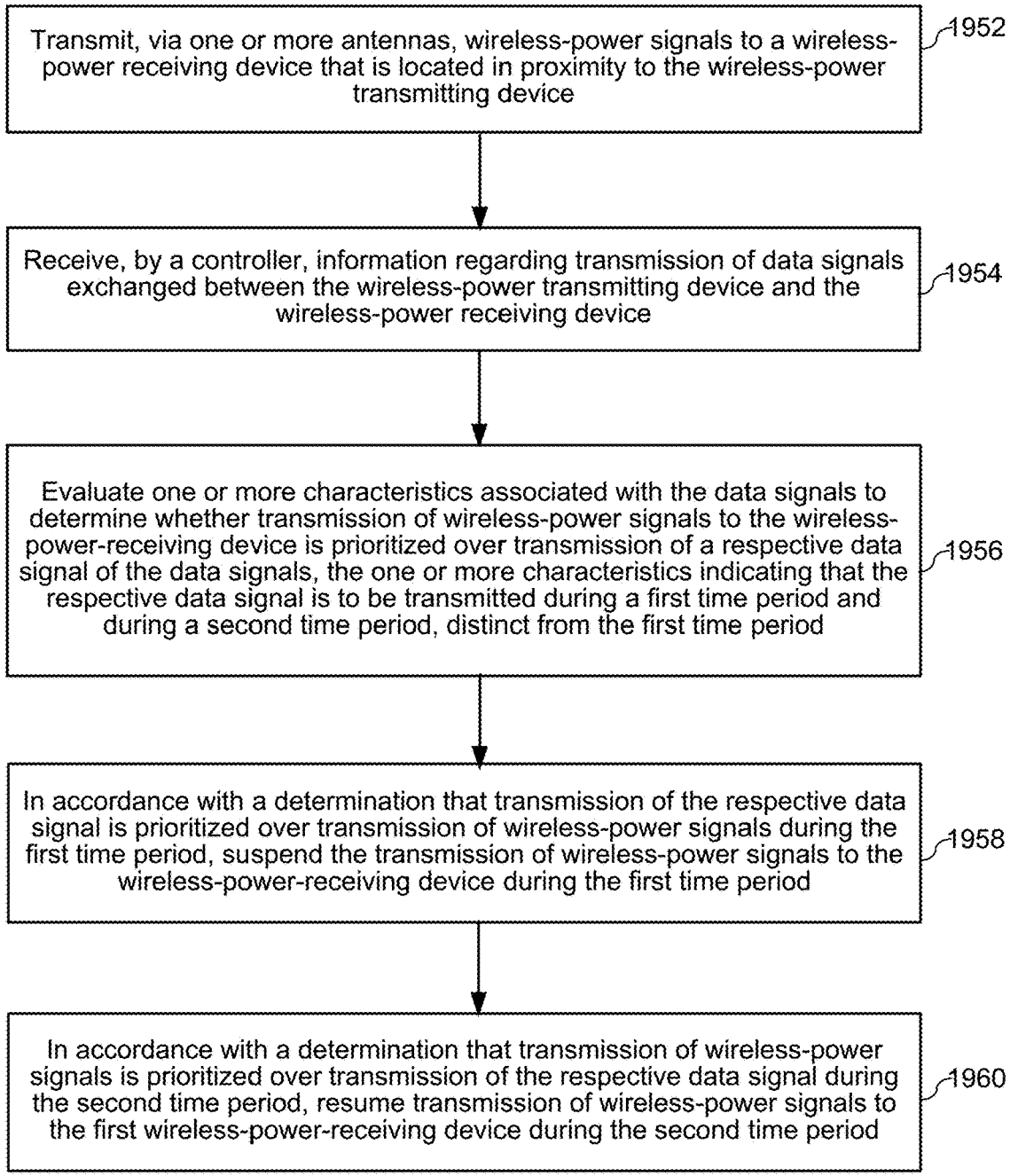

FIG. 19B is a flow diagram showing a method 1950 of wireless power transmission, in accordance with some embodiments. Operations (e.g., steps) of the method 1950 may be combined with one or more operations of the method 1900 to perform the wireless power transmission. In some embodiments, the method 1950 may be performed by a wireless-power-transmitting device (e.g., transmitter 102, FIG. 1; also referred to as "wireless-power transmitter", "transmitter") having a controller, a wireless data transceiver (e.g., communications component(s) 112, FIG. 1), one or more antennas (e.g., antenna array(s) 110, FIG. 1) configured to transmit wireless-power signals to one or more wireless-power-receiving devices, and one or more processors (processor(s) 104, FIG. 1). In some embodiments, at least some of the operations shown in FIG. 19B correspond to instructions stored in a computer memory or computer-readable storage medium (e.g., memory 104 of the transmitter 102, FIG. 1).

In some embodiments, the establishing of traffic profiles may be predetermined (i.e., no need to establish in accordance with one or more triggering events) and also that the information regarding the data signals may be detected on the fly or may be reported to the transmitter by the power-receiving device or some other device. In some embodiments, the power-receiving device may aggregate information for more than itself (e.g., the receiver may aggregate information from nearby peripheral or other power receiving or data communicating device(s)). For example, the receiver may report data signals that are to be exchanged between a nearby Bluetooth mouse and keyboard, as those signals could also be affected by transmission of high-power level signals nearby.

The wireless-power transmitter transmits (1952), via the one or more antennas, wireless-power signals to a wireless-power-receiving device that is located in proximity to the wireless-power-transmitting device. The wireless-power transmitter then receives (1954), by the controller, information regarding transmission of data signals exchanged between the wireless-power-transmitting device and the wireless-power-receiving device.

The wireless-power transmitter evaluates (1956) one or more characteristics associated with the data signals to determine whether transmission of wireless-power signals to the wireless-power-receiving device is prioritized over transmission of a respective data signal of the data signals. In some embodiments, the one or more characteristics indicate that the respective data signal is to be transmitted during a first time period and during a second time period, distinct from the first time period. For example, for a certain time period, which type of data is transmitted when considering the battery level and/or charging need.

In accordance with a determination that transmission of the respective data signal is prioritized over transmission of wireless-power signals during the first time period, the wireless-power transmitter suspends (1958) the transmission of wireless-power signals to the wireless-power-receiving device during the first time period.

In accordance with a determination that transmission of wireless-power signals is prioritized over transmission of the respective data signal during the second time period, the wireless-power transmitter resumes (1960) transmission of wireless-power signals to the first wireless-power-receiving device during the second time period.

In some embodiments, the one or more sets of data communication signals include one or more of: (1) a set of power control data signals including one or more parameters associated with transmission of the plurality of first wireless-power signals and (2) a set of application data exchanged between the wireless-power-transmitting device and the first wireless-power-receiving device.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106, 134, and/or 142) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory (e.g., 106, 134, and/or 142) optionally includes one or more storage devices remotely located from the CPU(s) (e.g., processor(s) 104, 132, and/or 140). Memory (e.g., 106, 134, and/or 142), or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the transmitters 102 and/or receivers 120), and for enabling a processing system to interact with other mechanisms utilizing the results of the present invention. Such software or firmware may include, but is not limited to, application code, device drivers, operating systems, and execution environments/containers.

Communication systems as referred to herein (e.g., communications components 112, 136, and/or 144) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZigBee, wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of wireless power transmission, the method comprising:
    while a wireless-power-transmitting device is transmitting wireless power to a wireless-power-receiving device based on a data-traffic profile that includes identifications of (i) data signals that will be exchanged at different points of time over a predetermined frequency band, and (ii) respective priority levels of each respective data signal, the respective priority levels including a high-priority level and a low-priority level:
        determining, using the data-traffic profile:
            a first window of time of a set of windows of time during which to, over the predetermined frequency band, (i) transmit wireless-power signals and (ii) exchange low-priority data signals, to the wireless-power-receiving device; and
            a second window of time of the set of windows of time during which to suspend transmission of wireless-power signals while exchanging high-priority data signals to the wireless-power-receiving device;
        after determining, using the data-traffic profile, the first and second windows of time, transmitting the wireless-power signals during the first window of time while exchanging the low-priority data signals and suspending the wireless-power signals during the second window of time while exchanging the high-priority data signals;
        during the second window of time, based on data indicating a charge level of the wireless-power-receiving device, (i) interrupting the exchanging of high-priority data signals, and (ii) resuming transmission of wireless-power signals;
        providing a notification to a user regarding the interruption of the high-priority data signals with a choice to select a time to resume transmission of the high-priority data signals; and
        responsive to a selected time to resume exchange of the high-priority data signals, determining, using the data-traffic profile, a third window of time of the set of windows of time during which to, over the predetermined frequency band, alternate (i) transmitting wireless-power signals and (ii) exchanging the high-priority data signals.

2. The method of claim 1, wherein:
    the data indicating the charge level of the wireless-power-receiving device indicates that the charge level of the wireless-power-receiving device is below a charge-level threshold.

3. The method of claim 2, further comprising resuming exchange of the high-priority data signals during a fourth window of time after the charge level of the wireless-power-receiving device is above the charge-level threshold.

4. The method of claim 1, wherein:
    wireless-power signals are transmitted at a lower power level during the first window of time as compared to a power level used to transmit wireless-power signals during the third window of time.

5. The method of claim 1, further comprising:
    based on determining that at least some high-priority data has been lost in accordance with interrupting the exchange of the high-priority data signals:
        determining, using the data-traffic profile, a respective window of time to resend the data signals associated with the high-priority data.

6. The method of claim 1, wherein:
    the low-priority data signals are associated with text data; and
    the high-priority data signals are associated with video data.

7. The method of claim 1, wherein:
    the wireless-power-receiving device is a first wireless-power-receiving device; and
    the transmitting of the wireless-power signals to the first wireless-power-receiving device during the first window of time is based on the wireless-power-transmitting device prioritizing the first wireless-power-receiving device over a second wireless-power-receiving device based on one or more of:
        respective battery states of the first wireless-power-receiving device and the second wireless-power-receiving device;

respective device types of the first wireless-power-receiving device and the second wireless-power-receiving device; and respective priority levels of application data exchanged respectively (i) between the wireless-power-transmitting device and the first wireless-power-receiving device, and (ii) between the second wireless-power-receiving device.

8. The method of claim 7, wherein:

the low-priority data signals are being transmitted to the first wireless-power-receiving device; and the high-priority data signals are being transmitted to the second wireless-power-receiving device.

9. A wireless-power-transmitting device, comprising:

one or more antennas configured to transmit wireless-power signals;

one or more processors; and a wireless data transceiver, wherein the wireless-power-transmitting device is configured to:

while the wireless-power-transmitting device is transmitting wireless power to a wireless-power-receiving device based on a data-traffic profile that includes identifications of (i) data signals that will be exchanged at different points of time over a predetermined frequency band, and (ii) respective priority levels of each respective data signal, the respective priority levels including a high-priority level and a low-priority level:

determining, using the data-traffic profile:

a first window of time of a set of windows of time during which to, over the predetermined frequency band, (i) transmitting wireless-power signals and (ii) exchanging low-priority data signals, to the wireless-power-receiving device; and a second window of time of the set of windows of time during which to suspend transmission of wireless-power signals while exchanging high-priority data signals to the wireless-power-receiving device;

after determining, using the data-traffic profile, the first and second windows of time, transmitting the wireless-power signals during the first window of time while exchanging the low-priority data signals and suspending the wireless-power signals during the second window of time while exchanging the high-priority data signals;

during the second window of time, based on data indicating a charge level of the wireless-power-receiving device, (i) interrupting the exchanging of high-priority data signals, and (ii) resuming transmission of wireless-power signals;

providing a notification to a user regarding the interruption of the high-priority data signals with a choice to select a time to resume transmission of the high-priority data signals; and responsive to a selected time to resume exchange of the high-priority data signals, determining, using the data-traffic profile, a third window of time of the set of windows of time during which to, over the predetermined frequency band, alternate (i) transmitting wireless-power signals and (ii) exchanging the high-priority data signals.

10. A non-transitory computer-readable storage medium comprising instructions, which when executed by one or more processors of a wireless-power-transmitting device having one or more antennas configured to transmit wireless-power signals and a wireless data transceiver, cause the wireless data transceiver to:

while a wireless-power-transmitting device is transmitting wireless power to a wireless-power-receiving device based on a data-traffic profile that includes identifications of (i) data signals that will be exchanged at different points of time over a predetermined frequency band, and (ii) respective priority levels of each respective data signal, the respective priority levels including a high-priority level and a low-priority level:

determining, using the data-traffic profile:

a first window of time of a set of windows of time during which to, over the predetermined frequency band, (i) transmit wireless-power signals and (ii) exchange low-priority data signals, to the wireless-power-receiving device; and a second window of time of the set of windows of time during which to suspend transmission of wireless-power signals while exchanging high-priority data signals to the wireless-power-receiving device;

after determining, using the data-traffic profile, the first and second windows of time, transmitting the wireless-power signals during the first window of time while exchanging the low-priority data signals and suspending the wireless-power signals during the second window of time while exchanging the high-priority data signals;

during the second window of time, based on data indicating a charge level of the wireless-power-receiving device, (i) interrupting the exchanging of high-priority data signals, and (ii) resuming transmission of wireless-power signals;

providing a notification to a user regarding the interruption of the high-priority data signals with a choice to select a time to resume transmission of the high-priority data signals; and responsive to a selected time to resume exchange of the high-priority data signals, determining, using the data-traffic profile, a third window of time of the set of windows of time during which to, over the predetermined frequency band, alternate (i) transmitting wireless-power signals and (ii) exchanging the high-priority data signals.

11. The wireless-power-transmitting device of claim 9, wherein the data indicating the charge level of the wireless-power-receiving device indicates that the charge level of the wireless-power-receiving device is below a charge-level threshold.

12. The wireless-power-transmitting device of claim 11, wherein the wireless-power-transmitting device is further configured to:

resume exchange of the high-priority data signals during a fourth window of time after the charge level of the wireless-power-receiving device is above the charge-level threshold.

13. The wireless-power-transmitting device of claim 9, wherein wireless-power signals are transmitted at a lower power level during the first window of time as compared to a power level used to transmit wireless-power signals during the third window of time.

14. The wireless-power-transmitting device of claim 9, wherein the wireless-power-transmitting device is further configured to:

based on determining that at least some high-priority data has been lost in accordance with interrupting the exchange of the high-priority data signals:
  determining, using the data-traffic profile, a respective window of time to resend signals associated with the high-priority data.

15. The wireless-power-transmitting device of claim 9, wherein:
  the low-priority data signals are associated with text data; and
  the high-priority data signals are associated with video data.

16. The non-transitory computer-readable storage medium of claim 10, wherein the data indicating the charge level of the wireless-power-receiving device indicates that the charge level of the wireless-power-receiving device is below a charge-level threshold.

17. The non-transitory computer-readable storage medium of claim 16, further comprising instructions for:
  resume exchange of the high-priority data signals during a fourth window of time after the charge level of the wireless-power-receiving device is above the charge-level threshold.

18. The non-transitory computer-readable storage medium of claim 10, wherein wireless-power signals are transmitted at a lower power level during the first window of time as compared to a power level used to transmit wireless-power signals during the third window of time.

19. The non-transitory computer-readable storage medium of claim 10, further comprising instructions for:
  based on determining that at least some high-priority data has been lost in accordance with interrupting the exchange of the high-priority data signals:
    determining, using the data-traffic profile, a respective window of time to resend data signals associated with the high-priority data.

20. The non-transitory computer-readable storage medium of claim 10, wherein:
  the low-priority data signals are associated with text data; and
  the high-priority data signals are associated with video data.

* * * * *